(12) United States Patent
Carr

(10) Patent No.: US 11,300,453 B2
(45) Date of Patent: Apr. 12, 2022

(54) PHOTONIC- AND PHONONIC-STRUCTURED PIXEL FOR ELECTROMAGNETIC RADIATION AND DETECTION

(71) Applicant: William N. Carr, Gainesville, FL (US)

(72) Inventor: William N. Carr, Gainesville, FL (US)

(*) Notice: Subject to any disclaimer, the term of this patent is extended or adjusted under 35 U.S.C. 154(b) by 0 days.

(21) Appl. No.: 17/353,421

(22) Filed: Jun. 21, 2021

(65) Prior Publication Data
US 2021/0381900 A1    Dec. 9, 2021

Related U.S. Application Data

(63) Continuation-in-part of application No. 16/501,641, filed on May 16, 2019, and a continuation-in-part of
(Continued)

(51) Int. Cl.
| | | |
|---|---|---|
| G01J 5/00 | (2006.01) |
| G01J 5/12 | (2006.01) |
| G01J 5/20 | (2006.01) |
| G01J 5/061 | (2022.01) |
| G01J 5/08 | (2022.01) |

(52) U.S. Cl.
CPC ............... *G01J 5/12* (2013.01); *G01J 5/061* (2013.01); *G01J 5/0853* (2013.01); *G01J 5/0896* (2013.01); *G01J 5/20* (2013.01); *G01J 2005/0077* (2013.01); *G01J 2005/062* (2013.01); *G01J 2005/123* (2013.01); *G01J 2005/202* (2013.01)

(58) Field of Classification Search
CPC .. G01J 5/12; G01J 5/061; G01J 5/0853; G01J 5/0896; G01J 5/20; G01J 2005/0077; G01J 2005/062; G01J 2005/123; G01J 2005/202
See application file for complete search history.

(56) References Cited

U.S. PATENT DOCUMENTS

| | | |
|---|---|---|
| 2,462,946 A | 3/1949 | Coggeshall et al. |
| 2,764,021 A | 9/1956 | Sims et al. |
| (Continued) | | |

FOREIGN PATENT DOCUMENTS

| | | | | |
|---|---|---|---|---|
| WO | WO-03023794 A2 * | 3/2003 | ......... | H01L 27/0802 |
| WO | WO-2004083840 A1 * | 9/2004 | ............. | G01N 27/14 |

OTHER PUBLICATIONS

Advisory Action (PTOL-303) dated Jun. 3, 2021 for U.S. Appl. No. 16/501,641.
(Continued)

*Primary Examiner* — Kiho Kim
(74) *Attorney, Agent, or Firm* — Kaplan Breyer Schwarz, LLP

(57) ABSTRACT

A thermal pixel configured as an electromagnetic emitter and/or an electromagnetic detector. The thermal pixel comprises a micro-platform suspended with semiconductor nanowires from a surrounding support platform. The nanowires comprise phononic structure providing a decrease in thermal conductivity. In some embodiments, the pixel is structured for operation within a broad bandwidth or a limited bandwidth. Metamaterial and/or photonic crystal filters provide pixel operation over a limited bandwidth. In some other embodiments, the micro-platform comprises a nanotube structure providing a broadband emission/absorption spectral response.

20 Claims, 17 Drawing Sheets

Related U.S. Application Data application No. 16/221,500, filed on Dec. 15, 2018, now abandoned, and a continuation-in-part of application No. 15/805,698, filed on Nov. 7, 2017, now Pat. No. 10,008,373, and a continuation-in-part of application No. 15/727,249, filed on Oct. 6, 2017, now abandoned, and a continuation-in-part of application No. 15/632,462, filed on Jun. 26, 2017, now abandoned, and a continuation-in-part of application No. 15/626,151, filed on Jun. 18, 2017, now Pat. No. 9,817,130.

(56) References Cited

U.S. PATENT DOCUMENTS

| | | | |
|---|---|---|---|
| 3,711,771 | A | 1/1973 | Hume et al. |
| 3,812,717 | A | 5/1974 | Miller et al. |
| 4,101,781 | A | 7/1978 | Neukermans et al. |
| 5,784,400 | A | 7/1998 | Joannopoulos et al. |
| 6,060,327 | A | 5/2000 | Keen |
| 6,917,431 | B2 | 7/2005 | Soljacic et al. |
| 7,072,547 | B2 | 7/2006 | Assefa et al. |
| 7,205,764 | B1 | 4/2007 | Anderson et al. |
| 7,261,461 | B2 * | 8/2007 | Grudin ............ G01N 25/20 374/141 |
| 7,307,732 | B2 | 12/2007 | Beausoleil |
| 7,474,811 | B1 | 1/2009 | Quitoriano et al. |
| 7,836,566 | B1 | 11/2010 | Olsson et al. |
| 7,948,041 | B2 | 5/2011 | Bryant et al. |
| 8,017,923 | B2 | 9/2011 | Inoue et al. |
| 8,094,023 | B1 | 1/2012 | El-Kady et al. |
| 8,492,737 | B2 | 7/2013 | Araci et al. |
| 8,508,370 | B1 | 8/2013 | El-Kady et al. |
| 8,552,380 | B1 | 10/2013 | Florin et al. |
| 9,006,857 | B1 | 4/2015 | Carr |
| 9,103,775 | B2 | 8/2015 | Bradley et al. |
| 9,164,026 | B2 | 10/2015 | Chakravarty et al. |
| 9,214,604 | B2 | 12/2015 | Ali et al. |
| 9,236,552 | B2 | 1/2016 | Carr |
| 9,291,297 | B2 | 3/2016 | Allen et al. |
| 9,496,313 | B2 | 11/2016 | Edwards et al. |
| 9,722,165 | B2 | 8/2017 | Carr |
| 9,772,062 | B2 | 9/2017 | Allen et al. |
| 9,799,798 | B1 | 10/2017 | Luk et al. |
| 9,817,130 | B1 | 11/2017 | Carr |
| 10,008,373 | B1 | 6/2018 | Carr |
| 2004/0119129 | A1 | 6/2004 | Giboney |
| 2004/0190915 | A1 | 9/2004 | Murray et al. |
| 2006/0286488 | A1 | 12/2006 | Rogers et al. |
| 2007/0101813 | A1 | 5/2007 | Cai et al. |
| 2008/0278728 | A1 | 11/2008 | Tetz et al. |
| 2009/0085191 | A1 * | 4/2009 | Najafi ............ B81B 7/0064 257/698 |
| 2010/0056892 | A1 | 3/2010 | Ben-Barak et al. |
| 2010/0126548 | A1 | 5/2010 | Jang et al. |
| 2010/0282617 | A1 | 11/2010 | Rothberg et al. |
| 2011/0045660 | A1 | 2/2011 | Romano et al. |
| 2011/0263036 | A1 | 10/2011 | Blauw et al. |
| 2011/0279334 | A1 | 11/2011 | Smith et al. |
| 2012/0149126 | A1 | 6/2012 | Wilson et al. |
| 2012/0206726 | A1 | 8/2012 | Pervez et al. |
| 2013/0005606 | A1 | 1/2013 | Chakravarty et al. |
| 2013/0176554 | A1 | 7/2013 | Loncar et al. |
| 2013/0284612 | A1 | 10/2013 | Park et al. |
| 2014/0061486 | A1 | 3/2014 | Bao et al. |
| 2014/0170392 | A1 | 6/2014 | Allen et al. |
| 2014/0202515 | A1 | 7/2014 | Haase |
| 2014/0326902 | A1 | 11/2014 | Tahan et al. |
| 2014/0378328 | A1 | 12/2014 | Chakravarty et al. |
| 2015/0124252 | A1 | 5/2015 | Pervez et al. |
| 2015/0124336 | A1 | 5/2015 | Kaufman |
| 2015/0207052 | A1 | 7/2015 | Carr |
| 2016/0054343 | A1 | 2/2016 | Holmes et al. |
| 2016/0240762 | A1 | 8/2016 | Carr |
| 2016/0271870 | A1 | 9/2016 | Brown |
| 2017/0194308 | A1 | 7/2017 | Evans et al. |
| 2017/0194398 | A1 | 7/2017 | Kim et al. |
| 2018/0031171 | A1 | 2/2018 | Allen et al. |
| 2020/0018714 | A1 | 1/2020 | Carr |

OTHER PUBLICATIONS

Cui et al., "Nanowire nanosensors for highly sensitive and selective detection of biological and chemical species", 2001, Science, vol. 293, pp. 1289-1292.

Examiner initiated interview summary (PTOL-413B) dated Mar. 23, 2018 for U.S. Appl. No. 15/805,698.

Examiner Interview Summary Record (PTOL-413) dated May 21, 2021 for U.S. Appl. No. 16/501,641.

Examiner Interview Summary Record (PTOL-413) dated May 25, 2021 for U.S. Appl. No. 16/501,641.

Final Rejection dated Apr. 20, 2021 for U.S. Appl. No. 16/501,641.

Non-Final Rejection dated Dec. 2, 2020 for U.S. Appl. No. 16/501,641.

Non-Final Rejection dated Jul. 16, 2021 for U.S. Appl. No. 16/501,641.

Notice of Allowance and Fees Due (PTOL-85) dated Mar. 23, 2018 for U.S. Appl. No. 15/805,698.

Office Action Appendix dated May 21, 2021 for U.S. Appl. No. 16/501,641.

Requirement for Restriction/Election dated Mar. 12, 2021 for U.S. Appl. No. 16/540,184.

Requirement for Restriction/Election dated Oct. 21, 2020 for U.S. Appl. No. 16/501,641.

Examiner Interview Summary Record (PTOL-413) dated Aug. 17, 2021 for U.S. Appl. No. 16/501,641.

Notice of Allowance and Fees Due (PTOL-85) dated Aug. 3, 2021 for U.S. Appl. No. 16/540,184.

Office Action Appendix dated Aug. 17, 2021 for U.S. Appl. No. 16/501,641.

\* cited by examiner

501

502

503

504

505

506

507

508

509

510

511

512

513

514

515

516

PHOTONIC- AND PHONONIC-STRUCTURED PIXEL FOR ELECTROMAGNETIC RADIATION AND DETECTION

STATEMENT OF RELATED CASES

This case is a continuation-in-part of U.S. patent application Ser. No. 16/501,641 filed May 16, 2019, U.S. patent application Ser. No. 16/221,500 filed Dec. 15, 2018, U.S. patent application Ser. No. 15/805,698 filed Nov. 7, 2017, U.S. patent application Ser. No. 15/727,249 filed Oct. 6, 2017, U.S. patent application Ser. No. 15/632,462 filed Jun. 26, 2017, and U.S. patent application Ser. No. 15/626,151 filed Jun. 18, 2017. These applications are incorporated herein by reference. If there are any contradictions or inconsistencies in language between the present specification, and the aforementioned applications that are incorporated by reference that might affect the interpretation of the claims in this case, the claims in this case should be interpreted to be consistent with the language in this case.

FIELD OF THE INVENTION

The present invention pertains to an apparatus comprising a nanostructured pixel for sourcing and detection of photonic electromagnetic radiation.

BACKGROUND OF THE INVENTION

The first electrically-powered photonic emitter manufactured in significant quantities was the incandescent electric light patented by Edison in U.S. Pat. No. 223,898 issued 1880. The more efficient semiconductor LED photo source patented by Biard and Pittman, U.S. Pat. No. 3,293,513 issued in 1966 provided another significant innovation in the history of photonic emitters based on a forward biased pn junction providing NIR emission within a limited bandwidth. An incandescent emitter fabricated at microscale on a silicon substrate is disclosed in Blomberg et al in U.S. Pat. No. 5,644,676. More recently, meta materials and photonic crystals adapted as electromagnetic emitters and absorbers have been disclosed with electromagnetic emission and absorption at wavelengths ranging from visible into the millimeter range.

The Kirchhoff law of photonic radiance in thermal equilibrium states that an electromagnetic emitting surface having a high emissivity is also a good electromagnetic absorber of radiation. This Kirchhoff law is closely related to the duality principle of electromagnetic antennas. Invoking this Kirchhoff law, photonic structures in this disclosure are referred to as emitters and/or absorbers.

Existing emitters and absorbing detectors based on metamaterial structure are disclosed in the following:

Burgos et al "*Color imaging via nearest neighbor hole coupling in plasmonic color filters integrated onto a complementary MOS image sensor*", ACS Nano, 7, (2013), 10038-10047 disclose a metamaterial plasmonic pixel of extent 6×6 um$^2$ comprised of a filter for visible light comprising an Al-dielectric-Cu stack.

H. Wang et al, "*Titanium-nitride-based integrated plasmonic absorber/emitter for solar thermophotovoltaic application*", Photon. Res, 3, (2015), 329-334 disclose a plasmonic metamaterial emitter with an ALO surface area film over a AlN/TiN sandwich with 90% absorptivity for visible light wavelengths.

H. Wang et al, "*Switchable wavelength-selective and diffuse metamaterial absorber/emitter with a V02 phase transition spacer layer*", App. Phys. Lett., 105, (2014), 071907 disclose a metamaterial infrared absorber/emitter structured as a tri-level sandwich comprising a Bragg resonant first layer overlaying an intermediate layer of VO2 having an underlying reflecting metal film. When heated, the VO2 becomes metallic and the absorptance spectral peak vanishes providing a means for switching or tuning.

A Ghanekar et al, "*Novel and efficient Mie-metamaterial thermal emitter for thermophotovoltaic systems*," Optics Express vol. 24, pp A868-A877 (2016) 26063 disclose a metamaterial thermal emitter comprised of randomly-disposed tungsten particles within an SiO2 film matrix over a reflecting tungsten film. The Mie-resonance of the nanoparticles provides a non-plasmonic emitter for visible and near infrared light wavelengths.

M. Shaban et al "*Tunability and sensing properties of plasmonic/1D photonic crystal*", Scientific Reports, 7, (2017), 41983 disclose a photonic crystal (PhC) absorber comprised of random metal grains over a sandwich of stacked $SiO_2$/SiN films. The surface grains provide a plasmonic resonance at the edge of the photonic band-gap (PBG). When heated, the thermal emission is in the visible for this proto absorber design. Readout is obtained by sensing a transmissive beam vectored normal to the plane of the absorber.

X. Liu, X et al, "*Experimental realization of a terahertz all-dielectric metasurface absorber*" Optics Express, (2017), vol. 25, 281296 disclose a nonplasmonic terahertz absorber with 97.5% efficiency at a frequency of 1 THz and with a Q=14. The metasurface structure is comprised of a first layer of patterned Si disks disposed over an unpatterned SiO2 film.

W. Zhu, W et al, "Tunneling-enabled spectrally selective thermal emitter based on flat metallic films", Appl. Phys. Lett., 106, (2015), 10114 disclose a metamaterial thermal emitter tuned for maximum emissivity at 10 um. The ALO plasmonic surface is excited with photonic tunneling of the evanescent wave from a Fabry-Perot cavity.

S. Luk et al, in U.S. Pat. No. 9,799,798 disclose a metamaterial infrared light source comprised of a quantum well, multi-layer stack. This thermal emitter is comprised of a semiconductor metamaterial having alternating layers of doped semiconductor material and undoped semiconductor material configured to form a plurality of quantum walls. When heated, the metamaterial radiates at a wavelength wherein the effective permittivity is near zero.

Ali et al in U.S. Pat. No. 9,214,604 disclose a metamaterial infrared light source comprised of a dielectric membrane with laterally spaced metal plasmonic structures.

Araci, et al, in U.S. Pat. No. 8,492,737 disclose a metamaterial infrared light source comprised of a plasmonic stacked metal-dielectric-metal structure of Wand HfO2 layers.

Carr in U.S. Pat. No. 9,006,857 discloses a micro-platform comprised of a radiation detector supported by nanowires wherein the micro-platform and structures disposed therein are thermally isolated from a surrounding off-platform area. Phononic structures within the nanowires reduce the thermal conductivity. In U.S. Pat. No. 9,236,552, Carr discloses a thermoelectric micro-platform for cooling and temperature sensing.

E. Rephaeli et al in "*Ultrabroadband photonic structures to achieve high-peformance daytime radiative cooling*", Nano Letters, vol 13, 1457-1461 (2013) disclose a metamaterial infrared emitter comprising an array of surface plasmonic polariton (SPP) elements of SIC and SiO2. This passive emitter without nanowires comprises a photonic crystal (PhC). The structure cools a surface of micro-dimensions through infrared blackbody radiation.

Adomanis et al, in "Bi-layer metamaterials as fully functional, near-perfect infrared absorbers", Appl. Phys. Lett. 107, 021107 (2015) disclose a metamaterial sandwich comprising two patterned metal layers with dielectric over a metal ground plane providing an efficient infrared absorber for the uncooled blackbody radiative emission range 8-14 nm.

W. Li et al in "Photonic thermal management of colored objects", Nature Comm, vol. 9, 4240 (October 2018) disclose a colored thin film surface having an emissivity of 99.7 $Wm^{-2}$ at 298K providing selective emissivity and absorption over a spectral range.

SUMMARY OF THE INVENTION

The present invention discloses an apparatus comprising a pixel having a micro-platform thermally isolated by phononic-structured nanowires, the platform further comprised of photonic structure providing electromagnetic emission and/or absorption over a limited wavelength range. The pixel provides an emitter and/or detector for infrared radiation.

In many embodiments, the photonic structure comprises a metamaterial ("MM") or photonic crystal ("PhC") structure providing a filter for infrared radiation. In embodiments, the photonic structure comprises a broadband absorber and/or emitter comprised of vertical wall carbon nanotubes. In other embodiments, the photonic structure comprises a more traditional electromagnetic emitter and/or absorber such as a quarter or half-wavelength antenna terminated into a characteristic load impedance. The micro-platform is thermally isolated from a surrounding support platform by phononic nanostructured wires, the wires structured to reduce thermal conductivity. In embodiments, the temperature of the micro-platform is affected by incident electromagnetic radiation, or internal temperature control elements. In embodiments, the micro-platform provides an infrared source and/or detector operated within one or more wavelength bands of interest wherein additional thermal elements are disposed on the micro-platform.

The Kirchhoff law of photonic emissivity relates importantly to aspects of the present invention. In accordance with this Kirchhoff law, we note that for example a perfect electromagnetic emitter in thermodynamic equilibrium with surroundings is also a perfect electromagnetic absorber of radiation. This permits any thermal micro-platform to be operated either as an electromagnetic emitter or an absorber. In some embodiments, a pixel is physically configured to provide both a thermal radiative emitter and a thermal absorber with the same physical micro-platform using a different interface circuit for each of the two functions.

In some embodiments, the apparatus of this invention includes: a thermal pixel, wherein the pixel comprises:
  a thermal micro-platform supported by a plurality of nanowires, wherein each nanowire is partially disposed on both the micro-platform and an off-platform region, the off-platform region surrounding the micro-platform;
  the thermal micro-platform comprising a photonic structure having at least one layer;
  and further wherein,
  a first layer of a plurality of the nanowires is physically configured with phononic scattering nanostructures and/or phononic resonant nanostructures providing a reduced thermal conductivity for the nanowires and the micro-platform is physically configured with one or more layers providing one or more of an emitter and/or absorber for electromagneticradiation within one or more wavelength bands.

In some embodiments, the pixel comprises a plurality of thermal platforms, disposed in a 1- or 2-dimensional array format to provide photonic emitters and/or photonic detectors for imaging.

In some embodiments, the thermal micro-platform is comprised of a temperature control element further comprised of one or more of a resistive heater device, a Peltier thermoelectric cooling device and a passive self-cooling structure. In an embodiment, the thermal micro-platform is comprised of one or more temperature sensing elements selected from the group comprising a Seebeck thermoelectric device, a thermistor, a subthreshold MOST, and a bandgap diode.

In some embodiments wherein the micro-platform is operated as an infrared detector, the thermal micro-platform is comprised of a Peltier thermoelectric device and a Seebeck thermoelectric device providing a means for null-readout for infrared signal. Here, the infrared signal amplitude is determined from calibrations of external power required to provide Peltier cooling sufficient to provide a null value for infrared absorbed into the micro-platform. Calibrations of cooling power versus absorbed radiation into the micro-platform provide a means of determining absorbed infrared power into the photonic structure of the micro-platform.

The thermal micro-platform comprises one or more layers-of lateral and/or stacked elements. In many embodiments, the photonic structure comprises resonant MM and in other embodiments the MM is comprised of nanostructured flakes imbedded within a dielectric matrix. Patterned MM metal elements may be disposed in a single level or separated by dielectric layers into multiple layers over a conducting ground plane. In some embodiments, the MM comprises metallic flakes embedded within a dielectric film. In some embodiments, the metamaterial emitter or absorber is a type of split-ring resonator ("SRR") or LC resonator. The thickness of the first layer of typical metamaterial elements typically ranges from a few nanometers to 1000 nm.

In some embodiments, MM is configured to increase surface plasmonic polaritons ("SPP") providing resonance within a limited wavelength band or bands. In this invention, SPPs within the metamaterial can be excited from an integral photon source such as an internal heater, internally-sourced tunneling electrons or from an external infrared beam source. An SPP is a type of bosonic quasiparticle having both wavelike and particle qualities.

In some embodiments, SPPs comprise electric dipole and magnetic dipole modes with subwavelength surface arrayed structures overlapping in frequency. SPPs comprise resonant structures with single and multiple tightly coupled ring resonators. Here SPPs are created in and around metallic structures. In this invention, the SPP is a sub-wavelength composite wherein the electromagnetic emission or absorption originates from oscillating electrons in a highly conducting metal. In embodiments, the plasmonic MM is designed to provide a specific resonant response defining the emission or detection wavelength.

In embodiments, the photonic structure comprises selected split ring structures of MM structured as Fano resonators to provide a narrow bandwidth resonance with accompanying high-Q emissivity and/or absorptivity.

In some embodiments, patterned MM comprises one or more of metallic, dielectric or semiconductor layers shaped variously as one or more of structures further comprising squares, crossbars, circles, resonant antennas, LC resonant elements and split ring resonant (SRR) structure in the form of structured layers, pits, dots and cavities. In embodiments, these structures are specifically structured to provide an electromagnetic resonance within a limited wavelength range further enhancing emissivity and/or absorptivity.

The MM structured pixel, in some embodiments, is comprised of multiple stacked or laterally disposed films and nanostructures further comprised of metal, dielectric, and particulate structures. In other embodiments, the MM structure is comprised of a material with thermal sensitivity such as vanadium oxide which undergoes a phase change from dielectric to metallic around the temperature 68° C.

In some embodiments, incident electromagnetic energy is not transmitted nor reflected, but rather is almost completely absorbed within the MM mode structure wherein a Seebeck thermoelectric sensing element provides an infrared detector function. Or alternatively, in the case wherein the micro-platform is heated to an elevated temperature, a MM structure can provide an almost perfect emitter within a limited range of wavelengths.

In some embodiments, the photonic structure comprises photonic crystal (PhC) structure, resonant antenna-like structure disposed in single layer or stacked configuration on the micro-platform.

Nanowire structuring and performance is now described. In accordance with the present teachings, a plurality of nanowires is physically configured with one or more first layers having phononic scattering and/or phononic resonant structures physically configured to reduce thermal conductivity. The effectiveness of phononic structures in reducing thermal conductivity is based on the duality principle in quantum mechanics which stipulates that a phonon can exhibit both wave- and particle-like properties at small scales. These structures reduce heat transport through the phononic nanowire by reducing the mean free path for phonon or dissipating phonons via structuring to enhance local resonances. In some modelling of nanowires with periodic nanostructuring, the reduction of phononic heat transport is explained by a phononic bandgap which restricts flow of phonons within an energy range. In embodiments, the phononic structures that reduce thermal transport in the nanowire may be disposed in both random and periodic configurations.

In some embodiments of this invention, the dominant mechanisms effecting phonon mean free path in the semiconductor nanowires are based on boundary scattering and resonant structures scaled at the atomic, molecular and nanometer level.

In some embodiments, the phononic structures are created in several forms. Phononic structures may be formed within a nanowire using deep submicron lithography. In other embodiments, phononic structuring is accomplished by creating a superlattice having intrinsic atomic- and molecular-level boundary scattering, creating scattering structure with E-beam implantation of heavy atoms, or creating local particulates of alloys such as SiGe.

In some embodiments, phononic structuring of nanowires is accomplished using a metal-assisted chemical etching to create porous silicon Y. Shao et al, "Ultralow thermal conductivity of single-crystalline porous silicon nanowires", [Adv. Functional Materials, vol. 27, 1702824 (2017)]. Phonons moving in the crystalline part of the nanowire are scattered at the surface of the pores.

In some other embodiments, phononic scattering structures within the nanowire may comprise molecular aggregates, implanted atomic species, and structures created by lithographic patterning. Thin films of semiconductor may be physically patterned with decorations to create a phononic crystal (PnC) having a phononic bandgap (see for example, S. Mohammadi et all, Appl Phys. Lett., vol. 92, (2008) 221905). Phononic bandgaps of PnCs define frequency bands where the propagation of heat-conducting phonons is forbidden. In some embodiments, wherein thermal conductivity of a nanowire is reduced, an array of phononic structures disposed within or on the surface of a nanowire provide layers of PnC. This structuring requires a periodic array of structures such as holes which exhibit elastic (phonon) band gaps. Phonon scattering within a PnC-structured nanowire is obtained by physically configuring the nanowire to reduce the phononic Brillouin zone and in some embodiments extend scattering to include successive PnC arrayed layers or interfaces. Nanowires configured with PnC structures can enhance both incoherent and coherent scattering of heat conducting phonons. PnC structures can provide a Bragg and/or Mie resonance of heat conducting phonons to reduce thermal conductivity. In embodiments of the present invention, a nanowire configured with phononic structures such as PnCs is considered to be a metamaterial nanowire.

Scattering structures disposed in a periodic array format generally provide an increased reduction in thermal conductivity compared with randomly disposed structures.

In some embodiments, Bragg resonant structures can also be provided in silicon nanowires by implanted elements such as Ar and Ge using a metal lithographic mask. Mie resonant structures comprise phonon transport within structures including holes, indentations and cavities within a first nanowire layer. (see M. Ziaci-Moayyed, et al "Phononic Crystal Cavities for Micromechanical Resonators", Proc. IEEE $24^{th}$ Intl Conf. on MEMS, pp. 1377-1381, (2011).

An aspect of the present invention is the physical nanowire adaptation providing phononic scattering and/or resonant structures to reduce the mean free path for thermal energy transport by phonons with limited reduction of nanowire electrical conductivity. The dimensions of phononic scattering structures are configured to not limit the longitudinal scattering range for electrons and thereby have limited effect on the bulk electrical conductivity of the nanowire.

In embodiments, the desired phononic scattering and/or resonant structures within nanowires may be created as one or more of randomly disposed and/or periodic arrays of holes, pillars, plugs, cavities, surface structures including quantum dots, implanted elemental species, and embedded particulates. This structuring, in embodiments, comprises a first layer of nanowires reducing the thermal conductivity.

In some embodiments, the one or more phononic layers of a nanowire is created based on an electrochemical or multisource evaporation process for a semiconductor film deposition and subsequent annealing to provide a porous or particulate-structured film. In other embodiments, a nanowire is selectively ion implanted with an atomic species such as Ar or H to provide scattering structures. Processes for the synthesis of thin films of nanometer thickness with porous, particulate structures, and implanted species is well known to those familiar with the art.

In embodiments, a first nanowire layer is comprised of a semiconductor structured to maintain a difference in mean free path for phonons and electrons. This is because most scattering structures affect both electrons and phonons with similar effectiveness. In embodiments, it is desirable to minimize electron scattering and maximize phonon scattering/resonances in the plurality of nanowires. In a semiconductor of the present invention, the mean free path for thermal transport ranges from less than 10 nm to over 1000 nm. The semiconductor nanowires will have electron mean free paths ranging from 1 nm up to 10 nm, much less than for phonons. In embodiments, the ratio of thermal to electrical conductivity is advantageously enhanced.

In embodiments, the phononic structures are formed into the patterned active layer of a silicon SOI starting wafer. In embodiments, the one or more nanowire first layers is a semiconductor selected from a group including silicon, germanium, silicon-germanium, gallium arsenide, gallium nitride, indium phosphide, silicon carbide, titanium nitride, and oxides of various metals including bismuth, titanium, and zinc. In embodiments, wherein an increased thermoelectric efficiency is desired, a nanowire layer may be a semiconductor selected from a group including Bi2Te3, BiSe3, CoSb3, Sb2Te3, La3Te4, SnSe, ZnS, CdS and alloys/superlattice combinations thereof.

In some embodiments, the nanowire is configured of a sandwich structure comprised of a second layer. The second layer is an ALO metal of nanometer thickness selected from a group including Pt, W, Pd, Cu, Ti, NiCr, Mo and Al providing an increased electrical conductivity for the nanowire. The second layer may be patterned as a film over the entire length of the nanowire. In embodiments, the second layer of metal connects further onto a thermal heating or cooling element disposed on the micro-platform.

In some embodiments, the nanowire is a sandwich structure comprised of a third layer of a dielectric material selected from one or more of silicon nitride, silicon oxynitride, aluminum oxide, silicon dioxide and metal oxides to provide electrical isolation and/or a reduction in mechanical stress. The third layer may extend beyond the nanowire and over the micro-platform providing a biaxial compensating stress to reduce overall film stress across the micro-platform. In embodiments, the third layer of dielectric material may be disposed between the first and second layers. In embodiments, the third layer may be disposed onto a second layer. In embodiments, the third layer may be disposed directly on the first layer. In some embodiments, nanowires comprise more than three layers.

In embodiments, one or more pixels are adapted to provide an electromagnetic emitter and/or detector. In embodiments, an apparatus comprised of one or more pixels is physically configured to provide a spectrometer or for analyzing incident thermal radiation or electromagnetic reflection from a remote media. In embodiments, both emitter and detector pixels are configured within an apparatus to provide an absorptive spectrophotometer. In other embodiments, pixels are configured within the apparatus are operated to provide antennas for transmitter and/or receiver of a communication system.

DETAILED DESCRIPTION

Definitions: The following terms are explicitly defined for use in this disclosure and the appended claims:

"micro-platform" means a platform having a maximum dimension of about 100 nanometers on a side up to about 1 centimeter.

"metamaterial (MM) structure" as defined uniquely for this specification means a photonic structure within the micro-platform having deep subwavelength dimensions providing an enhancement of electromagnetic emissivity and/or absorptivity or a reduction in thermal conductivity. The metamaterial structure may be plasmonic or non-plasmonic.

"metamaterial pixel or MM pixel" in the present invention means a pixel structurally configured as a metamaterial (MM) structure.

"photonic crystal (PhC) structure" means a photonic structure comprising areas of varying permittivity within the micro-platform and having dimensions on order of a wavelength providing an enhancement of electromagnetic emissivity and/or absorptivity.

"surface plasmonic polariton" (SPP) means a surface electromagnetic waveguided along a metamaterial-patterned surface having sufficient electrical conductivity to support associated electron motion.

"phononic crystal (PnC)" means a metamaterial structure comprised of periodic nanostructure that affects the thermal energy transport of phonons.

"nanowire" means a suspended structure providing support for a micro-platform.

"phononic nanowire" means a suspended nanowire comprising phononic scattering and/or phononic resonant structure providing a reduction in thermal conductivity.

"infrared" as defined uniquely for this specification means electromagnetic radiation including NIR, SWIR, MWIR, LWIR, and millimeter wavelengths.

"emitter" or "IR source" means a source of electromagnetic radiation within the spectrum including visible light, SWIR, MWIR, LWIR millimeter wavelengths.

"absorber" means an absorber of electromagnetic radiation within the spectrum including visible, SWIR, MWIR, LWIR and millimeter wavelengths.

"thermoelectric device" means a semiconductor junction device for conversion of thermal energy into electrical energy as a Seebeck device or vice versa as a Peltier device.

"bolometer" means a very sensitive temperature sensing device wherein its resistance varies with temperature.

"temperature control element" means a thermal device such as an electrically-heated resistor for heating, a Peltier thermoelectric device for cooling, and a passive blackbody structure configured for cooling by thermal radiation.

"temperature sensing element" means a device for sensing temperature such as a Seebeck thermoelectric sensor, thermister, subthreshold MOS transistor (MOST), bandgap diode and a bolometer.

"m, mm, um and pm" respectively means a unit of length as meter, millimeter, micrometer, nanometer and picometer, respectively.

FIGS. 1-5 depict pixels comprised of micro-platforms configured to provide sensing and cooling functions, as used in conjunction with embodiments of the invention.

Figure 1:
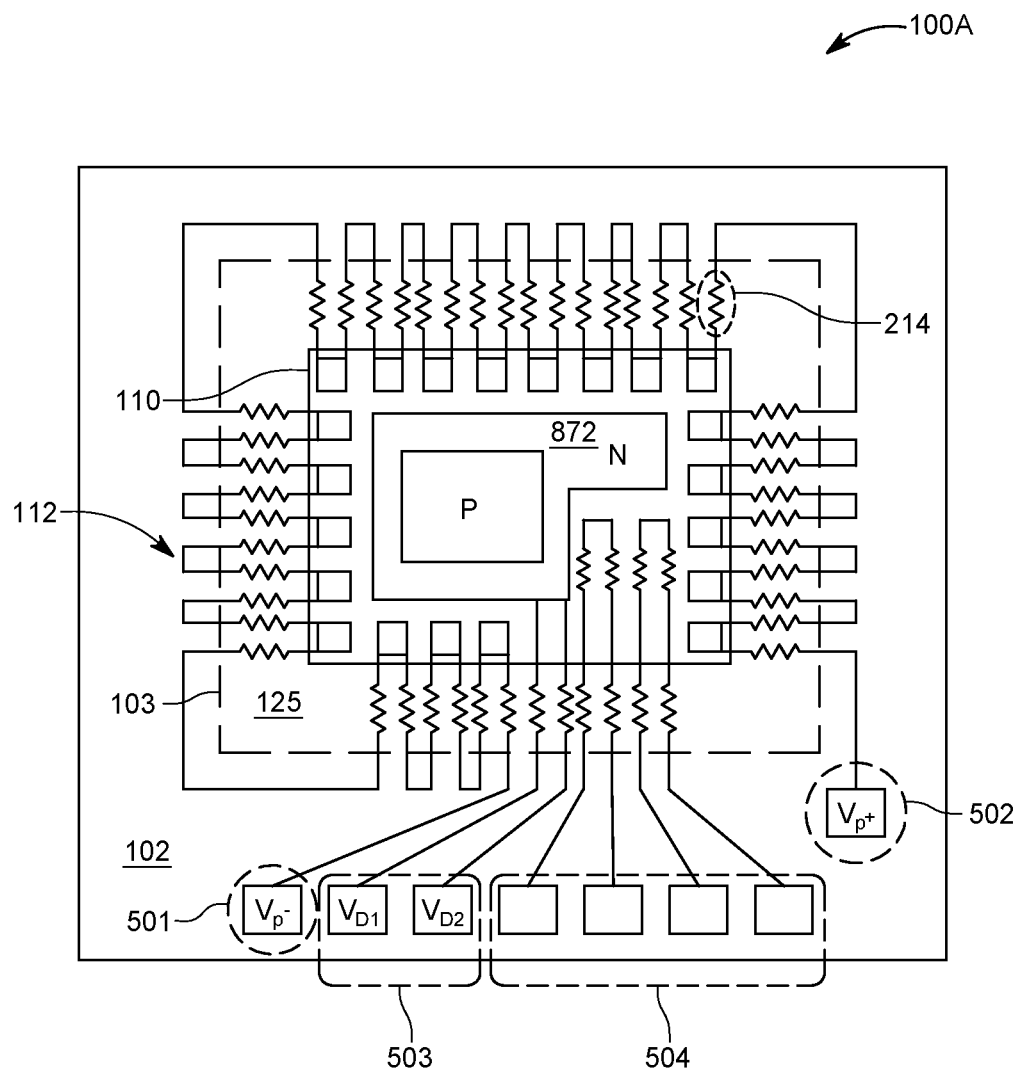
FIG. 1 is a plan view depicting a thermal micro-platform.

FIG. 1 is a plan view depicting micro-platform 110 with nanowires 214 supported by a surrounding support platform 102. Each nanowire 214 provides support for a portion of the periphery of the micro-platform 110. The micro-platform is suspended over cavity 125. In embodiments a series-connected array of thermoelectric elements 112 may provide either a Seebeck sensing or Peltier cooling function depending on the external circuit connected to pads 501 and 502. Since the Seebeck and Peltier thermoelectric effects are thermodynamically reversible, the Seebeck sensor device may also be operated as a Peltier cooler with electric power supplied by an external source. Another element 504 depicts resistive structures such as a thermistor or heater disposed on the micro-platform 110. In embodiments, the microplatform is comprised of a diffused pn junction diode 872 with external circuit connections 503 to provide a bandgap temperature sensor.

Figure 2:
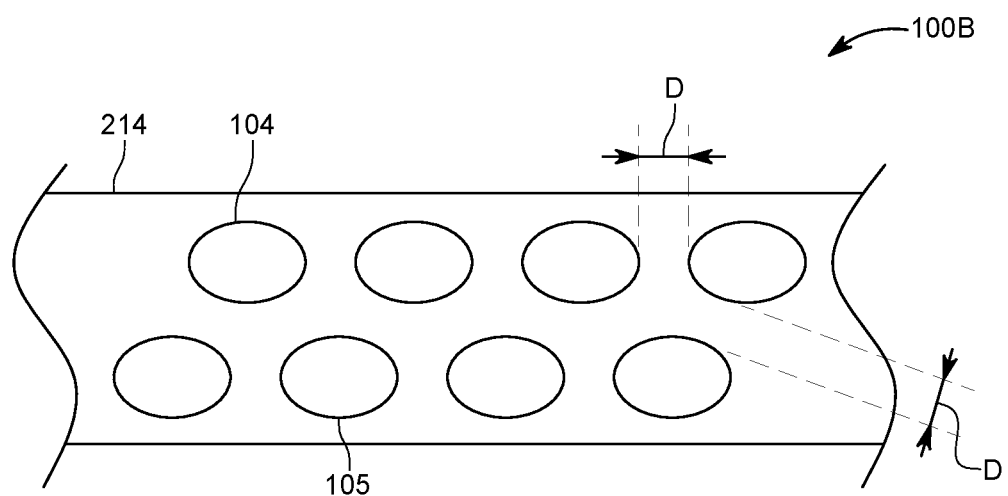
FIG. 2 depicts a nanowire with phononic structures providing a reduction in thermal conductivity.

FIG. 2 is an illustrative view depicting nanowire 214 having phononic nano-dimensioned holey structures 104 and 105. These phononic structures reduce the thermal conductivity of the nanowire by phononic scattering and/or phononic resonance.

Figure 3:
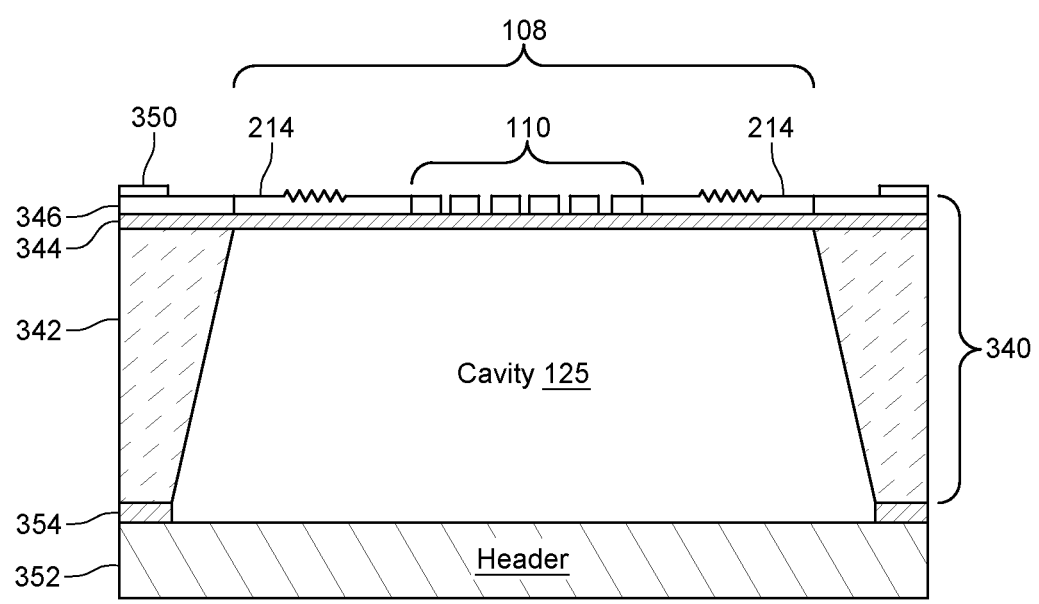
FIG. 3 is a cross-sectional view depicting a micro-platform released from a surrounding support platform using a backside etch.
Figure 4:
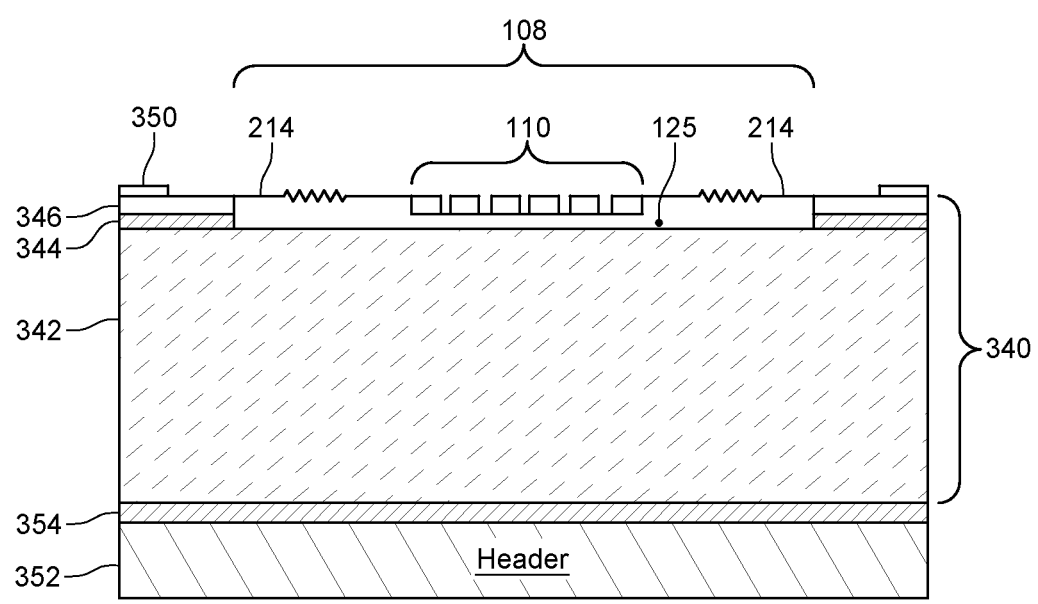
FIG. 4 is a cross-sectional view depicting a micro-platform released from a surrounding support platform using a topside etch.

FIGS. 3 and 4 depict cross-sectional views of structures comprising the micro-platform 110 of FIG. 1 with nanowires 214 comprised of active layer 346. In these illustrative depictions the multilayer structure 340 includes a dielectric film 344, handle wafer 342, bonding film 354 and a header 352. In embodiments, a patterned metallic contact 350 is connected to nanowire 214 to provide an electrical connection. The structure of FIG. 3 is comprised of a representative cavity 125 of extent 108 underlying the micro-platform 110, nanowires 214, and dielectric film 344. In embodiments, dielectric film 344 is removed or patterned to greatly reduce its area. The backside cavity is created by backside etching of the starting wafer of FIG. 1. In FIG. 4, a cavity 125 underlying the micro-platform 110 is created by topside etching of the starting wafer to create cavity 125.

Figure 5A:
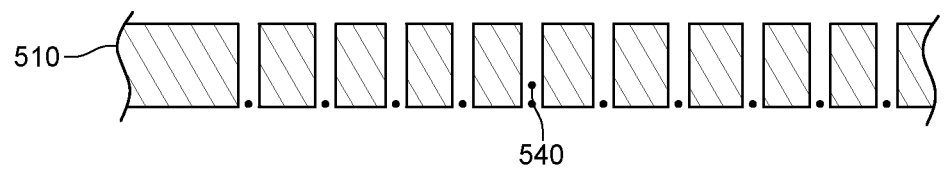
FIG. 5A is a cross-sectional view depicting a section of a nanowire comprised of a first layer providing a reduced thermal conductivity.

FIG. 5A depicts a nanowire with a first layer 510 comprised of phononic structures 540.

Figure 5B:
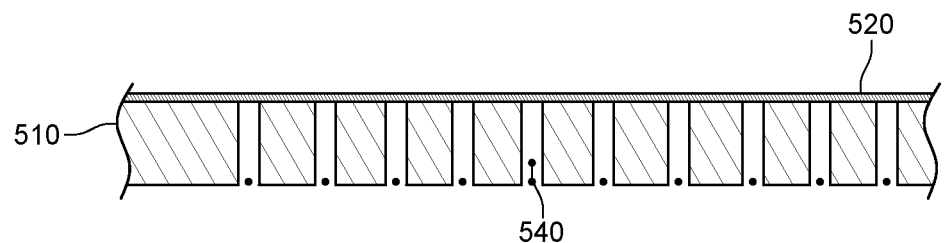
FIG. 5B is a cross-sectional view depicting a section of a nanowire comprised of a first and second layer in accordance with embodiments of the invention.

FIG. 5B depicts a nanowire comprising a first layer 510 and an added second electrically-conducting layer 520. The second metal layer 520 requires the first layer for structural rigidity.

Figure 5C:
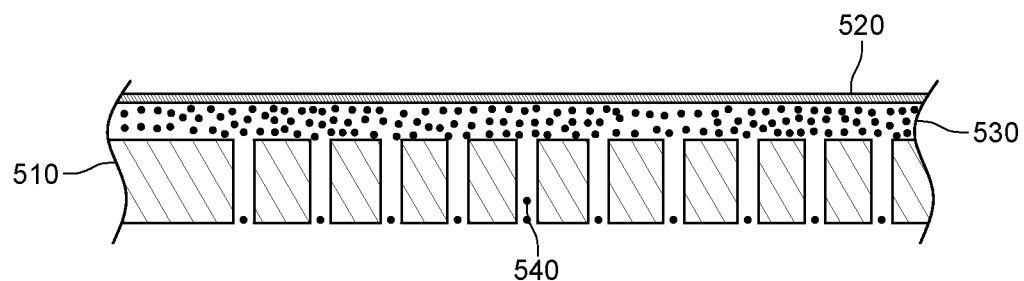
FIG. 5C is a cross-sectional view depicting a section of a nanowire comprised of a first, second and third layer.

FIG. 5C depicts a nanowire comprised of three layers wherein an intermediate dielectric film 530 provides electrical isolation between a first semiconducting layer 510 comprising phononic structures and another electrically-conducting second layer 520.

Figure 6A:
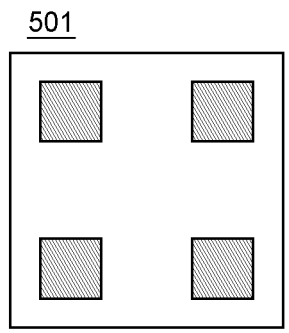
FIG. 6A is a plan view depicting arrays of one and two-dimensional photonic structures comprised of a patterned ALO metal layer disposed on a micro-platform in accordance with embodiments of the invention.
Figure 6A:
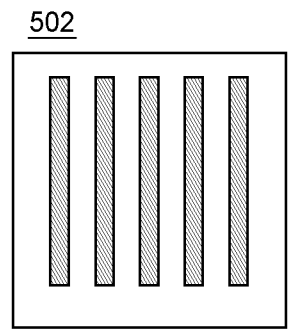
Figure 6A:
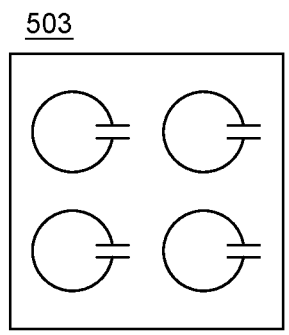
Figure 6A:
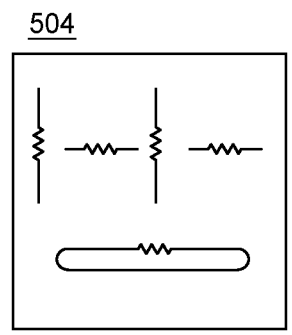
Figure 6A:
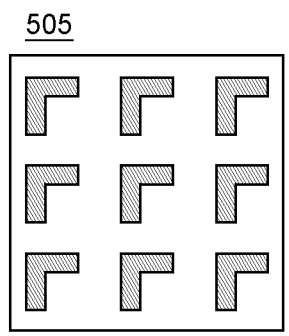
Figure 6A:
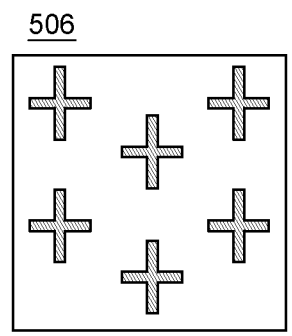
Figure 6A:
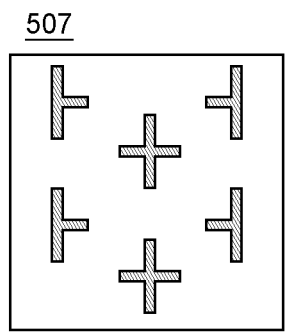
Figure 6A:
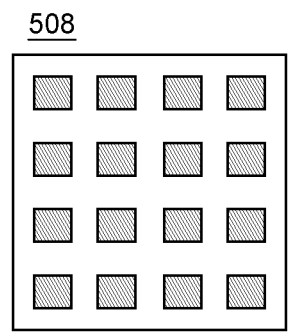
Figure 6B:
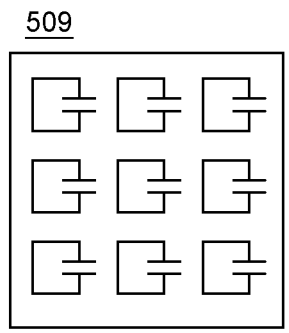
FIG. 6B is a plan view depicting metamaterial photonic structures disposed on a micro-platform in accordance with embodiments of the invention.
Figure 6B:
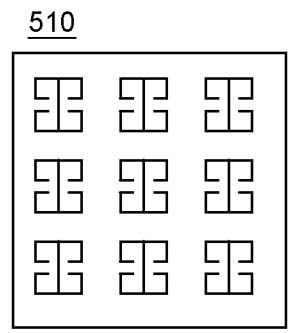
Figure 6B:
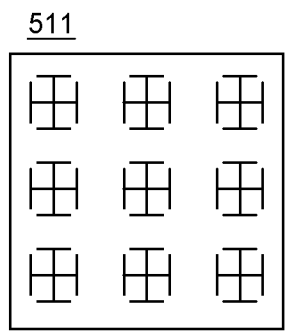
Figure 6B:
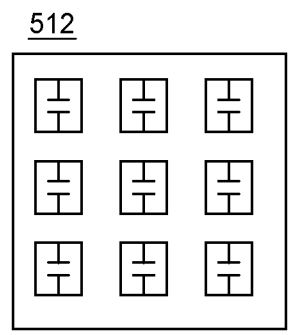
Figure 6B:
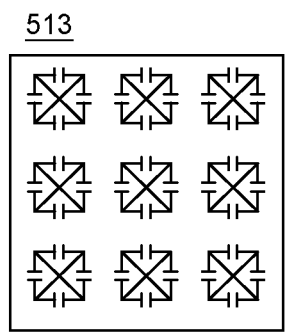
Figure 6B:
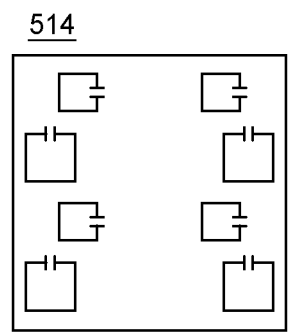
Figure 6B:
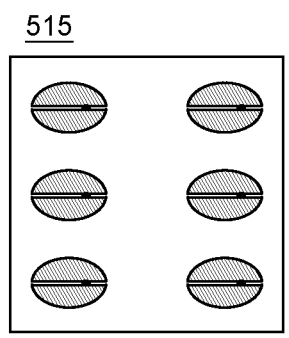
Figure 6B:
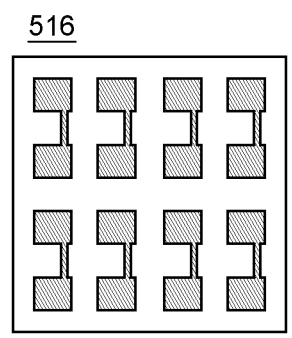

Cross-sectional views depicting the photonic surface elements of micro-platforms configured for infrared emission and absorption are depicted in FIG. 6A and FIG. 6B. These elements are disposed in a periodic matrix over an underlying dielectric film. In FIG. 6A all surface elements may comprise MMs and are scaled with deep subwavelength dimensions with the exception of element 504. Element 504 is an array of quarterwave antennas with primary application for absorptive heating with incident mm-wave irradiation. Element 502 of FIG. 6A in embodiments is also not necessarily an MM and may be configured as a conventional Bragg resonator, typically with spacings of near half-wavelength.

Elements 509-516 of FIG. 6B depict a micro-platform having a patterned metal surface of MM emitters and/or absorbers providing a surface plasmonic polariton (SPP) resonance with sensitivity over a limited bandwidth. Individual cells comprise single- and double-split ring resonators (SRRs). Element 514 comprises an array comprising two distinctively different single-SRR cells providing an emitter and/or absorber with two different or overlapping wavelengths.

The micro-platform can be configured with a photonic surface having a plurality of adjacent wavelength bands to provide an increased bandwidth. In embodiments, a microplatform configured with two or more emitting and/or absorbing structures of different periodicity or shape is used to advantageously provide operation within the extended wavelength band 8-14 um corresponding to a room temperature blackbody radiation primary spectrum.

MM structure provides an enhanced emissivity and absorptivity for emitter and detector functions. Each MM element supports a local resonant electromagnetic field which couples with fields originating from nearby elements within the larger MM matrix. When heated, the MM structure provides an efficient emitter of radiation, and, when not heated, it provides an efficient absorber of incident radiation. In some embodiments, the MM structure provides a thermal self-cooling when sufficient thermal isolation is provided to the micro-platform from local heat sources.

In embodiments, the photonic structure is a photonic crystal (PhC) having defect structure tuned for emission and/or radiation within an infrared bandwidth.

Each panel of FIG. 6A (501-508) shows portions of a larger array of patterned MM filter structures disposed on the micro-platform 610. The arrays of top-level structures depicted in FIG. 6A in embodiments comprise a patterned metal film over an underlying dielectric and metallic reflector. The individual elements 501-508 are of subwavelength dimension (as referred to free space wavelength). As an example, the principal wavelength of filter 501 is lower than that of filter 508 when the elements are disposed within a specific area. Panel 502 shows a 1-D Bragg grating structure which is polarization sensitive and configured as a MM element. Panel 503 shows split-ring resonant SRR elements which are typically used in filters with center frequencies in the very long wave infrared region. Panel 504 presents polarization-sensitive simple dipoles and a folded dipole resonant antenna forming a cell within a larger periodic antenna array. All panels except 504 and 507 each provide a single, primary bandwidth filter band. Panels 504 and 507 are characterized by multiple primary operational wavelength bands. Secondary bands within each format are generally observed which derive from minor resonances associated with specific dimensions and couplings beyond nearest neighbor elements. Bandwidth is increased wherein elements are spaced more closely.

FIG. 6B is a plan view depicting additional arrays of MM plasmonic metamaterial elements. Panels 509 through 516 present portions of periodic arrays comprised of split-ring resonators. Panel 514 depicts an array portion operational with two primary wavelengths.

Figure 6C:
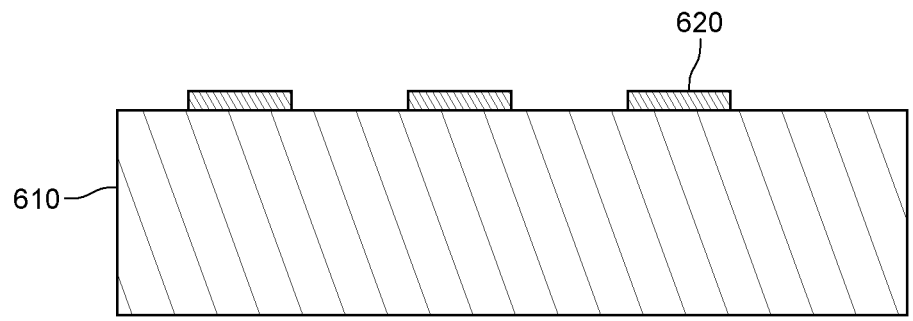
FIGS. 6C, 6D and 6E depict cross-sectional views of metamaterial or photonic crystal structures comprising 2-layers, 3-layers and 4-layers, respectively, in accordance with embodiments of the invention.

FIG. 6C is a cross-sectional view depicting MM plasmonic or PhC surface elements 620, such as those of FIG. 6A and FIG. 6B, disposed on a micro-platform substrate 610. The micro-platform 110 supports a field confinement adjacent to the surface elements 620. The patterned metal film 620 comprises raised, pillar-like structures on an underlying dielectric or semiconductor 110.

Metal films are chosen as the surface element 620 in many embodiments because metals provide a high plasma frequency and an increased density of electrons, especially for the shorter wavelengths, compared to a semiconducting or dielectric structural element. Advantageous maximum conductivity for these structured films is obtained with Au, Ag, and Cu metallization. Other preferred metals for performance over a wide range of wavelengths include W, Pd, Pt, Ni, Al, and Ti. The patterned, metallic MM elements are typically of thickness in the range of 10 nm to 200 nm.

Figure 6D:
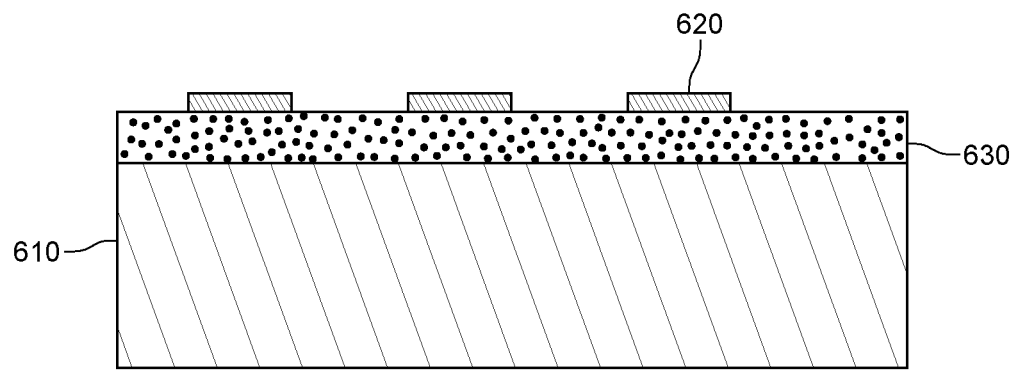

FIG. 6D is a cross-sectional view depicting plasmonic elements 620 disposed on a micro-platform substrate 610 with an intermediate dielectric film 630. The dielectric selected for low loss at the wavelength of interest and in some embodiments it is a film selected to reduce overall stress across the micro-platform. The dielectric film 630 is generally of thickness ranging from 30 nm to 1 um.

Figure 6E:
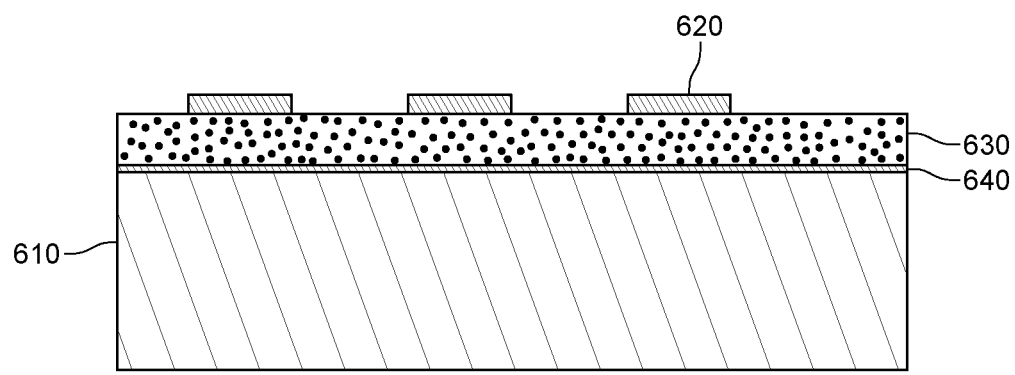

FIG. 6E is a cross-sectional view depicting surface plasmonic elements 620 disposed with three films disposed on the micro-platform 610. This tri-level film sandwich is comprised of an intermediate dielectric film 630 and metallic films 620, 640. In embodiments, the metallic films increase confinement of the electromagnetic field associated with the surface plasmonic structures 620 and increase overall emissivity and/or absorptivity.

In some other embodiments, a semiconductor or dielectric is structured as a PhC to provide emission and/or absorption over a limited wavelength range. In embodiments, these PhC structures may be raised areas, pillars, cavities, and holes wherein radiation wavelengths are determined by the defect structure within the PhC.

Tri-level MM photonic structures of FIG. 6E based on the panels of FIG. 6A and FIG. 6B in many cases provide an electromagnetic bandwidth quality factor Q of 10 or higher. In some embodiments, the multi-layering concept of FIG. 6E is extended to provide more than three layers. In some embodiments, stacked layers provide an emitter and/or absorber with bandwidth determined by both surface MM structures and thickness of multiple underlying dielectric layers (as in E. Raphaeli et al, 2013).

Appropriate stacked structuring with vertical plasmonic coupling between metallic elements at different stack levels provides a 3-D metamaterial structure. These 3-D stacked metamaterial structures can be optimized to provide a further narrowing or widening of the emission and/or absorption bandwidth.

In some embodiments, the bandwidth for operation can be significantly reduced by designing structures for Fano resonance which is typically of high-Q. This resonance can be obtained with plasmonic nanostructures of several types including plasmonic holey or particle arrays and even Bragg diffraction gratings.

Figure 7:
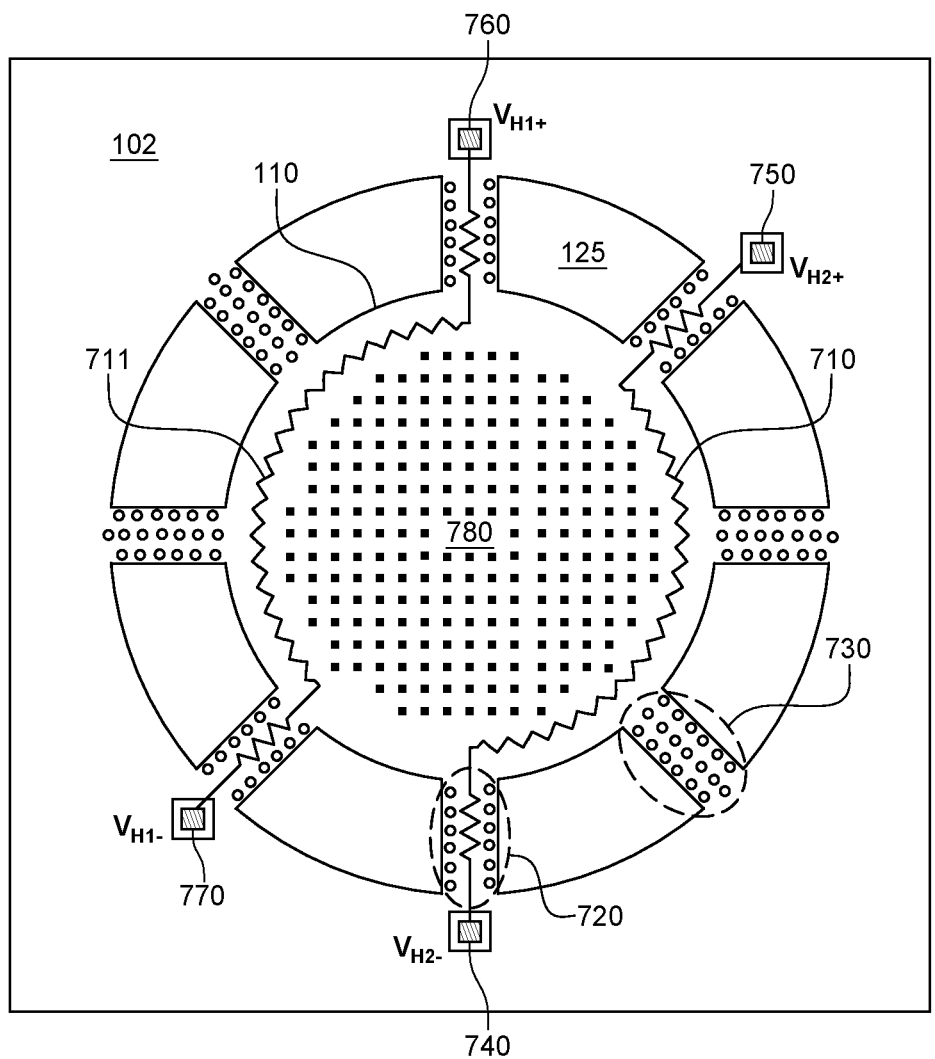
FIG. 7 is a plan view depicting the pixel configured to provide a metamaterial infrared source in accordance with embodiments of the invention.

FIG. 7 is a plan view depicting a semiconductor chip configured with a MM surface 780 to provide an infrared emitter. The surface 780 acts as a filter for blackbody-type thermal radiation spectrum derived from heating of the micro-platform 110. Thermal control elements disposed on the micro-platform 110 are resistive heaters (710 and 711). The resistive heaters receive power through contact pads 770, 750, 760, and 770. In some embodiments, one resistor 711 is operated as a resistive heater and resistor 710 is operated as a thermistor temperature sensor. Temperature control elements 710, 711 are typically an ALO metal film electrically insulated from the underlying micro-platform 110. The circular micro-platform 110 can have reduced physical stress within itself and onto support nanowires 720,730 permitting fabrication of larger micro-platforms 110 over the underlying cavity 125. The nanowires are tethered onto surrounding support platform 102 which provides a thermal heat sink. The micro-platform 110 is heated by a first heating element 710 disposed between bonding pads 740 and 750.

In some embodiments comprising the emitter of FIG. 7, the radiative structure 780 may comprise a selection including, without limitation, the structural options of FIGS. 6A and 6B. In the illustrative embodiment of FIG. 7, micro-platform 110 and nanowires formed of the active layer from a silicon SOI starting wafer can provide a controlled heating to temperatures as high as around 550° C. In other embodiments based in FIG. 7, the micro-platform and nanowires are comprised of silicon carbide or gallium nitride semiconductor films providing structural rigidity at temperatures of over 1000° C. Dielectric passivation films typically comprise one or more of silicon nitride, aluminum oxide, silicon dioxide and hafnium oxide.

Metal films are typically deposited prior to lithographic patterning with a DC magnetron tool. Dielectric films are generally deposited by RF sputtering. Patterning of these thin films is accomplished using a resist such as patterned PMMA with a lift-off process.

Backside etch to form cavity 125 is accomplished with ORIE or with patterned TMAH or KOH at an elevated temperature. Alternatively, topside formation of the cavity 125 is accomplished using a hot vapor HF etch or XeF2 with a patterned passivation layer of material such as SiJN4 protecting certain topside areas as desired.

Figure 8:
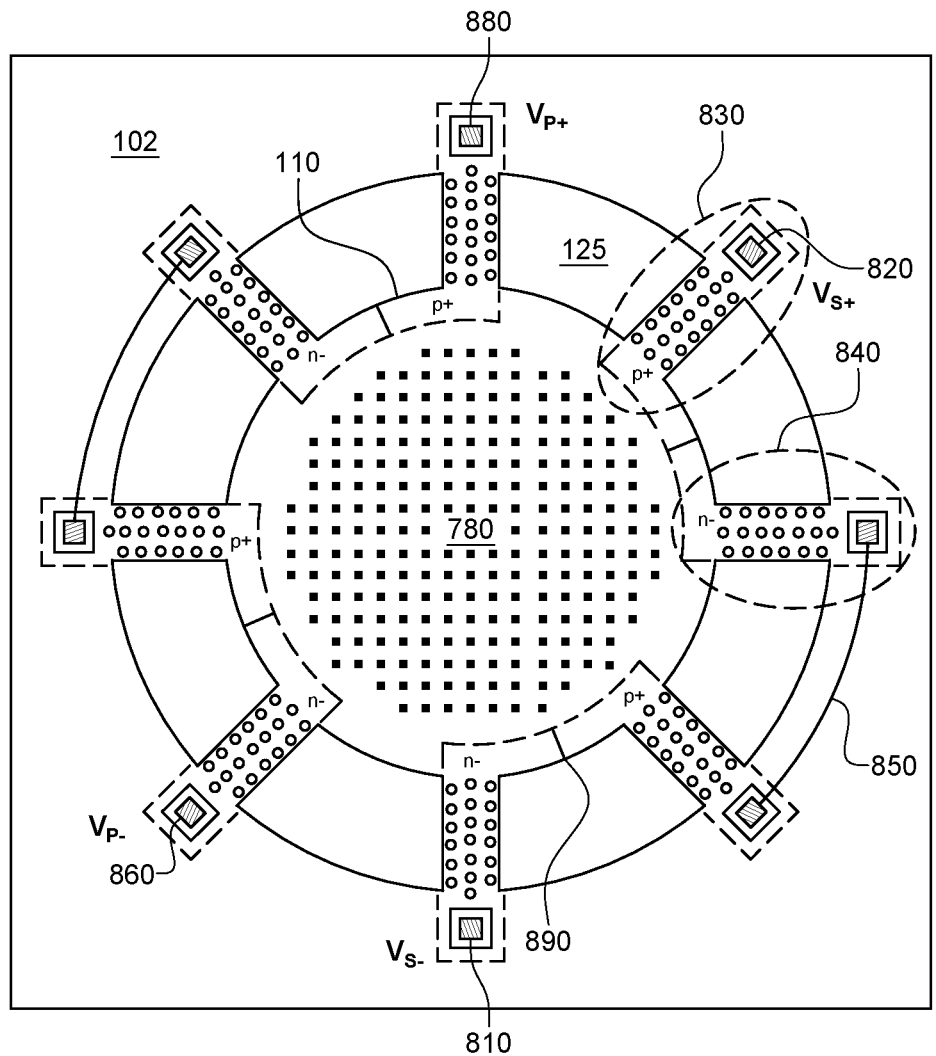
FIG. 8 is a plan view depicting the pixel configured to provide a metamaterial infrared detector in accordance with embodiments of the invention.

FIG. 8 is a plan view depicting a pixel adapted with surface structure 780 to comprising any of the illustrative filters of FIGS. 6A and 6B to provide an infrared detector. In this illustrative embodiment, the detector is comprised of a Seebeck sensing element and a Peltier controlled-cooling element. Micro-platform 110, supported by nanowires (depicted by 820,830), is disposed over cavity 125 with surrounding support platform 102.

Nanowires are comprised of heavily doped p+ and n– couplings (depicted as 820 and 840) connected in series to provide a first thermocouple series-connected between bonding pads 810,820. The first thermocouple is operated as a Seebeck sensing element to monitor incremental changes in temperature of the micro-platform in response to absorbed incident infrared radiation. A second series connection of thermocouples connected between bonding pads 860,880 is operated as a Peltier cooler. This Peltier cooler reduces micro-platform 110 temperature thereby advantageously reducing the thermal noise from the first thermoelectric sensing element.

In this illustrative depiction, the Seebeck sensor array of FIG. 8 comprises only two thermocouples. In embodiments, the micro-platform is populated with up to 2000 series-connected thermocouples, providing an increase in overall pixel responsivity (Volts/Watt) for pixel operation as a detector. In embodiments comprising the detector of FIG. 8, a MM infrared absorbing structure may include, without limitation, the first layer structure options of FIGS. 6A-6D providing sensitivity over a limited wavelength range. In some embodiments, the infrared absorbing structure 780 is physically configured alternatively as a broadband absorber comprising one or more of carbon nanotubes, a graphene mesh, carbon black, gold black and silicon grass.

In some embodiments, including the embodiment of FIG. 8, the micro-platform 110 is formed of the high resistivity active layer of a starting silicon wafer having a resistivity of over 1000 Ohm-cm. The heavily doped thermocouple regions are diffused directly into the high resistivity micro-platform 110. Sensed signal loss in Seebeck and thermistor structures due to the shunt effect of parasitic resistance in the high resistivity areas is thereby advantageously designed to be minimal.

For pixels formed from a starting silicon SOI wafer, the heavily doped thermocouple regions of p+ type 820 and n– type 830 semiconductor are typically formed by diffusion from a patterned spin-on glass having boron or phosphorus. DC sputtered aluminum interconnections are typically provided for metallization on micro-platforms 110 operated at temperatures up to 550° C. In application, standard process integrated circuits formed in the surrounding support platform 102 are maintained at room temperature. Selected ALO dielectric films are generally deposited by RF plasma sputtering or physical evaporation. Patterning is generally accomplished using a PMMA or similar resist with micro-dimensioning obtained with e-beam lithography or optical lithography as appropriate.

Pixels depicted in illustrative examples FIG. 7 and FIG. 8 permit fabrication of both infrared sources and detectors based on similar processes with lower cost production. The pixels of FIG. 7 and FIG. 8 are, in some embodiments, fully compatible with industry CMOS foundry production cleanroom processes.

In some embodiments, the pixel is mounted in a package backfilled with a gas of low thermal conductivity such as Xe, Kr or Ar. This reduces the parasitic loss due to thermal conductivity of atmosphere between the micro-platform and the pixel environment. In other embodiments, the pixel is disposed within a vacuum package wherein a further thermal isolation of the micro-platform 110 is provided.

In some pixel encapsulation embodiments, an additional resistive heater is disposed off-platform in thermal contact with a gettering material such as Bi or Ti. This heater for gettering may be disposed on a dedicated thermal micro-platform. When the resistive heater is powered, the gettering material is activated and the target gas component within the pixel enclosure is reduced.

Example 1—Multi-Wavelength Pyrometer

Figure 9:
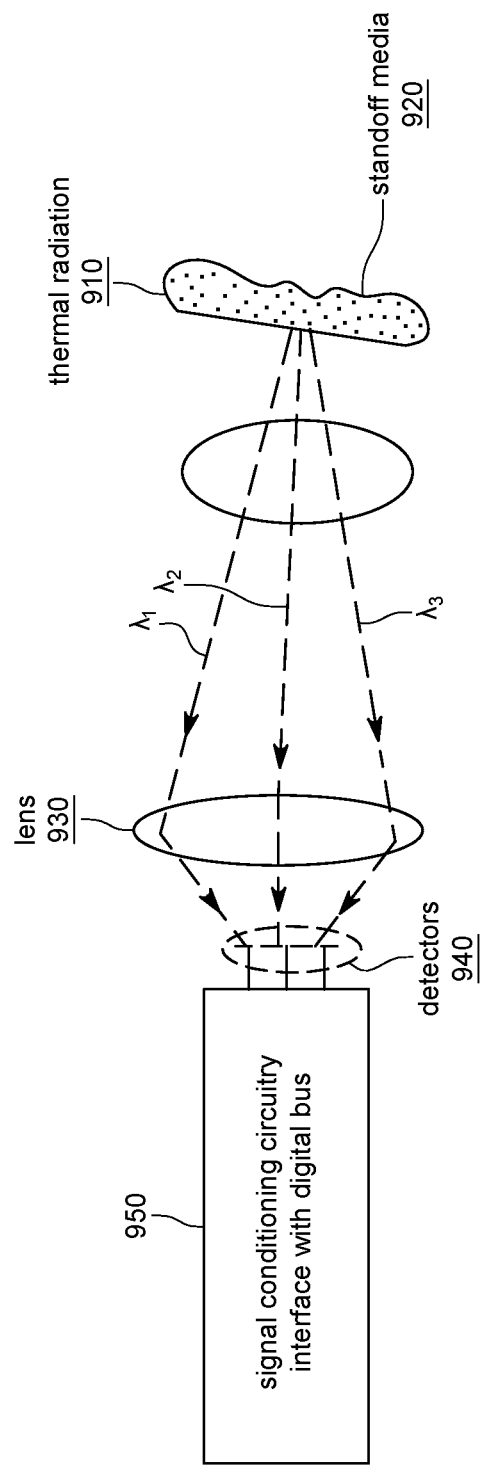
FIG. 9 depicts an apparatus comprising the pixel as a detector physically configured to provide a reflective spectrometer or pyrometer for monitoring the temperature of a remote surface in accordance with embodiments of the invention.

FIG. 9 depicts an apparatus comprised of multiple detector micro-platforms similar to the depiction of FIG. 8, physically configured to provide a standoff infrared analyzer for monitoring the temperature of thermal radiation 910 from a standoff media 920. Multiple detectors 940 are sensitive to separate wavelength bands of thermal radiation 910 emitted from standoff media 920. Optics 930 focus the radiation 910 from the remote media 920 onto the detectors 940. In this embodiment, signal conditioning circuitry 950 with an interface to a digital bus permits a determination of the temperature of a standoff media based on differential spectral analysis of the emitted thermal radiation. The pyrometer is calibrated using standoff media 920 of known temperature or known emissivity.

Example 2—Reflective Photospectrometer

Figure 10:
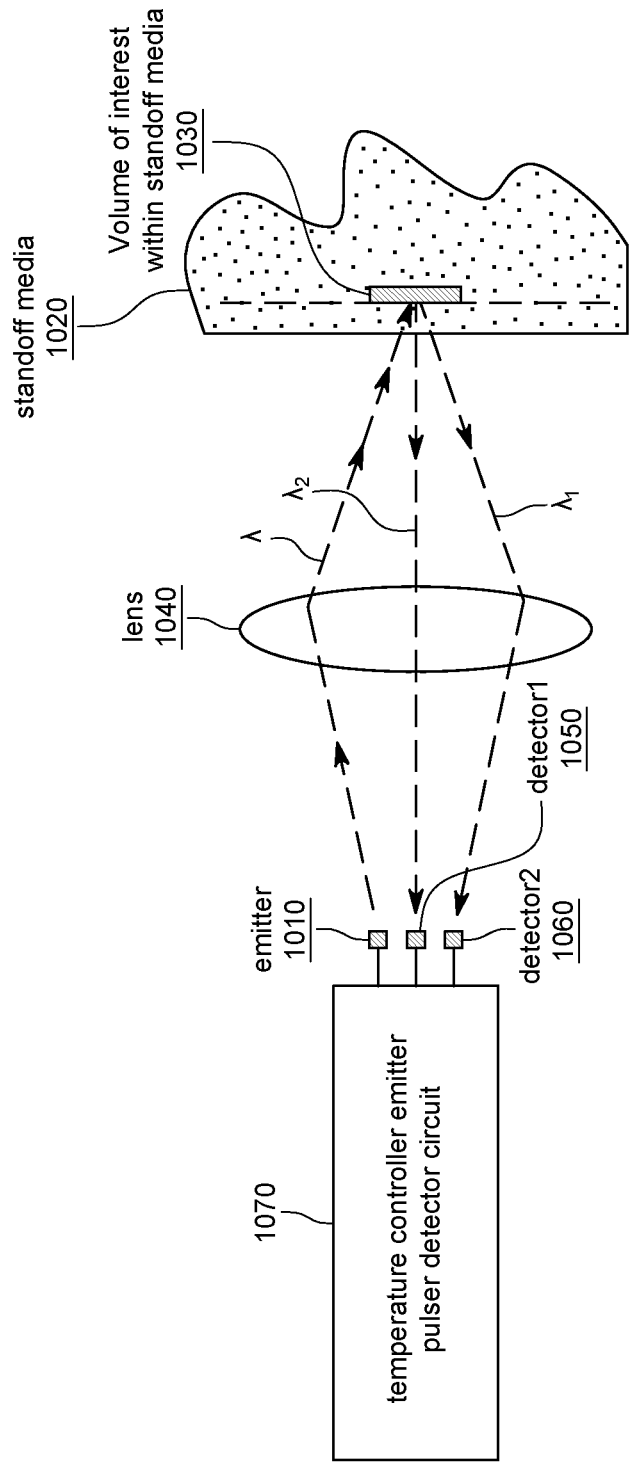
FIG. 10 depicts a reflective spectrophotometer incorporating pixels comprising an infrared beam source and an absorptive detector for analyzing spectra from a remote media in accordance with embodiments of the invention.

FIG. 10 depicts the pixel configured to provide a reflective photospectrometer comprising both an infrared source and an infrared detector for spectral analysis of reflectance from a standoff media. This configuration permits the use of a pulsed, infrared emitter 1010 and synchronous detection with detectors 1050, 1060 thereby increasing the signal-to-noise ratio of detected infrared reflection from media 1020. The spectrometer is comprised of both an emitter 1010 which illuminates a standoff media 1020 through focusing optics 1040. Detectors depicted as 1050 and 1060 monitor different wavelengths of reflection from media 1020. Platforms comprising the emitter 1010 and detector 1050,1060 are typically comprised of MM plasmonic absorbers. The reflectance 1030 from the standoff media 1020 is determined by the surface and near surface permittivity at various depths from the surface of the standoff media 1020. The detectors 1050 and 1060 are structured to provide sensitivity over selected wavelength bands within the emitted spectrum of the emitter 1010. The emitter and detectors are disposed on at least two different micro-platforms within one or more pixels. The spectrometer is comprised of circuits 1070 for powering the emitter and providing signal conditioning for the detectors. In applications, the spectrometer may provide monitoring of spectral reflectivity for building structures, processed food, agricultural fields, agricultural products and surface/internal imaging of objects.

Example 3—Absorptive Photospectrometer

Figure 11:
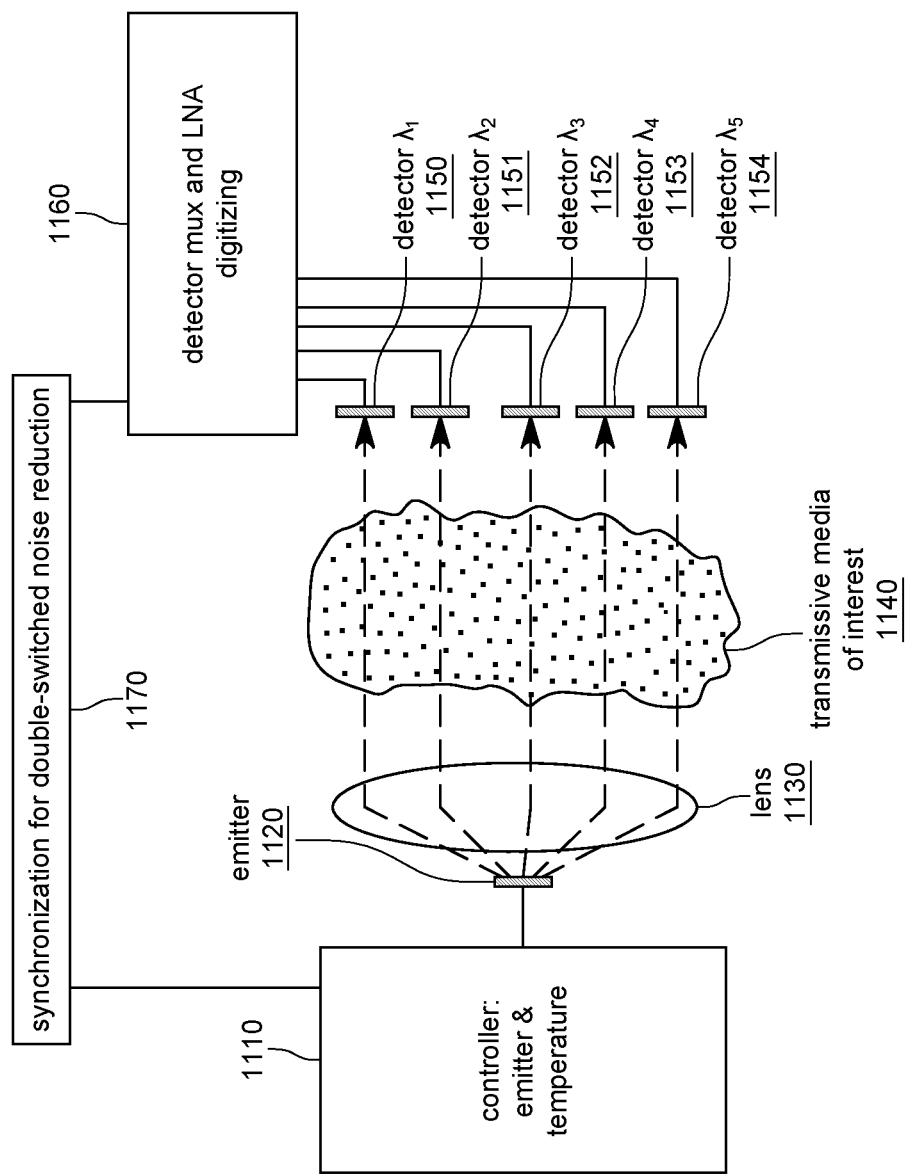
FIG. 11 depicts an absorptive spectrophotometer incorporating pixels in accordance with embodiments of the invention.

FIG. 11 depicts the pixel adapted to provide an absorptive photospectrometer wherein synchronization for doubleswitched noise is provided with control and detection circuits. This type of synchronized switching is also known as correlated double-sampling (CDS) and is well known to those skilled in the art as a means for reducing noise originating between the two sampling switches. This illustrative embodiment is comprised of an infrared emitter 1120 which transmits an infrared broadband beam with collimating optics 1130 transmitting through a semi-transparent media of interest 1140. The infrared beam attenuated by media 1140 terminates into infrared detectors 1150-1154. These detectors are each sensitive to a preselected wavelength band or multiple wavelength bands. The plurality of detectors tuned to various infrared wavelengths are disposed on separate micro-platforms. Controller 1110 temperature-cycles the micro-platform in synchronization with the detector MUX, LNA and digitizing signal conditioning circuits. In a typical embodiment, the photospectrometer components are disposed within a single enclosure having a cavity or other structure for the media of interest 1140. In embodiments, the emitter and detectors are comprised of plasmonic or nonplasmonic meta material devices. In some embodiments, the emitter and/or detectors are comprised of PhC filters.

Example 4—Emitter and Receiver for Infrared Communication

In some embodiments, the thermal micro-platform is physically configured as antenna within an infrared communication apparatus. Infrared emission from the thermal micro-platform is modulated by pulsed heating of the micro-platform thereby providing a transmitting antenna for the communication system. The same micro-platform or a different micro-platform is configured as a detector providing a receiving antenna for the communication system.

Photonic structure in the micro-platform may comprise a MM filter to provide communication over a limited infrared wavelength range. In some embodiments, the micro-platform may be configured for broadband communication with a non-resonant filter comprised of one or more of vertically-aligned nanotubes (especially carbon nanotubes), mesh of graphene, gold black, silicon grass or carbon black.

Figure 12:
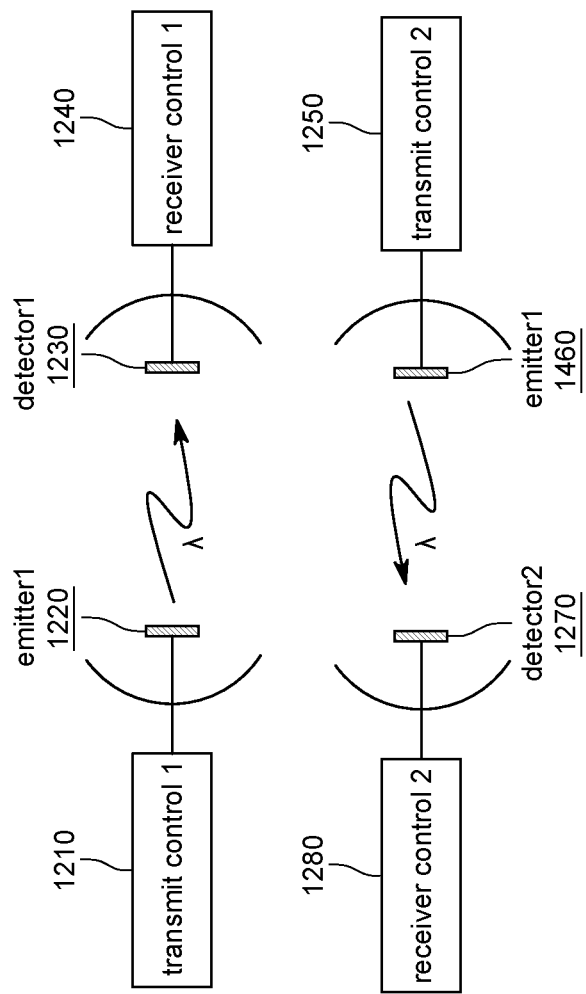
FIG. 12 depicts a transmitter and receiver within a communication system incorporating the pixel in accordance with embodiments of the invention.

FIG. 12 depicts pixels disposed within a full duplex communication system comprised of a forward path emitter1 1220 as transmitting antenna providing an infrared beam controlled by transmit controller 1230. The forward beam is received into detector1 1230 comprising a thermal micro-platform receiving antenna and processed further through receiver control1 1240. Similarly, the return signal transmitted as an infrared beam from emitter2 1460 as a transmitting antenna and received into detector2 1270 with further processing through receiver control2 1280. The emitters and detectors are comprised of M and/or PhC devices within separate pixels to provide communication over a limited bandwidth. Detection is obtained with Seebeck thermal sensing elements disposed in detectors 1230 and 1270. In some embodiments, the apparatus is physically configured with additional photonic thermal emitters and detectors to provide communication over multiple wavelength bands and with communication protocols such as FSK, FHSS and DSSS protocols.

Example 5—Passive Micro-Refrigerator

Figure 13A:
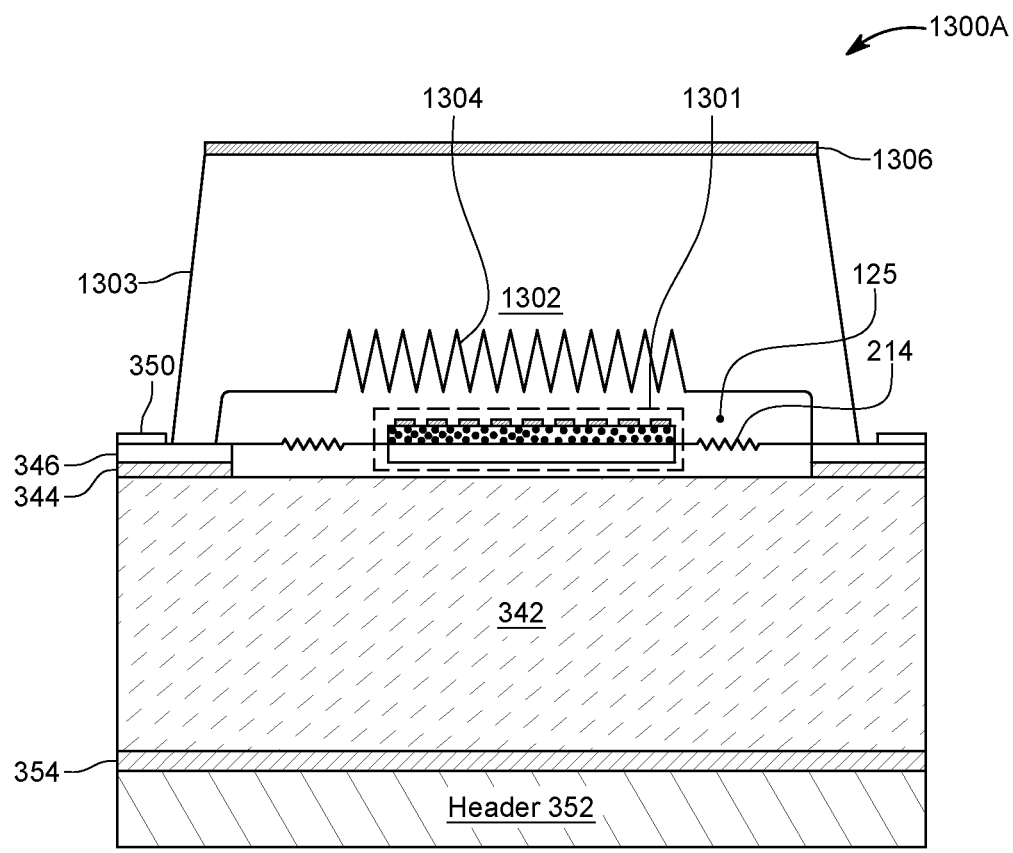
FIG. 13A depicts a cross-sectional view of the pixel configured for operation as a passive blackbody with a self-cooled micro-platform in accordance with embodiments of the invention.
Figure 13B:
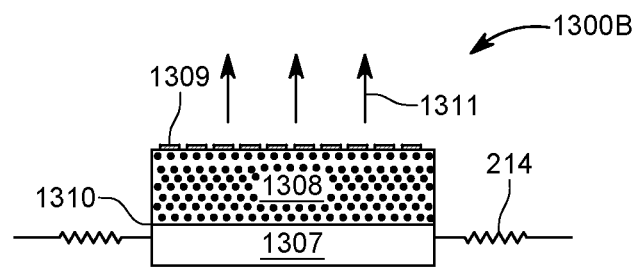
FIG. 13B depicts a cross-sectional view of the micro-platform of FIG. 13A physically configured as a self-cooled thermal detector in accordance with embodiments of the invention.

FIGS. 13A and 13B depict the pixel wherein the micro-platform is physically configured as a passive blackbody cooler based on its infrared source of radiation 1311. In this embodiment, blackbody radiation from the micro-platform 1301 provides a net thermal cooling of the micro-platform. Cooling of the micro-platform is obtained by reducing external heating to extreme levels. In this embodiment, the micro-platform is cooled without enabling Peltier thermoelectric cooling. The pixel is physically configured with phononic nanowires 214 of sufficiently low thermal conductivity and disposed within an enclosure wherein the internal surface of the enclosure does not radiate. Micro-platform 1301 is maintained under vacuum or a gas of low thermal conductivity within cavity 125.

The thermally-isolated micro-platform 1301 has application as a passive cooler for electronic components dissipating extremely low power, typically providing a reduction in thermal noise for the electronic components.

FIG. 13A depicts a cross-sectional view of a passive, self-cooled pixel wherein micro-platform 1301 is configured to provide a maximum blackbody emissivity over the spectral range 8 to 14 um wavelength of room temperature radiation and thus maximize the cooling effect. In this wavelength range the spectral radiance of a blackbody is in the range of 55 W/m$^2$/sr at room temperature.

In this embodiment, micro-platform 1301 comprises active silicon layer 1307 covered by a 3-layer metamaterial sandwich further comprised of a topside array of patterned MM structure 1309 over dielectric film 1308 and reflector layer 1310. The 3-layer sandwich comprises a MM emitter, typically designed for surface plasmonic polaritons tuned for electromagnetic emission 1311 in the NIR, MWIR and LWIR wavelength range. The electromagnetic emission 1311 originates as spontaneous blackbody radiation from the surface of micro-platform 1301. It propagates through vacuum cavity 125 and is collected into the field of non-reflecting, cone-shaped silicon absorbers 1304. Absorber 1304 is a micro-scale analog of the cone-structures of RF anechoic chamber walls. A shiny metal film 1306 is disposed on the upper surface of cap structure 1302 to reflect unwanted heat from external sources such as solar. The topside structure is formed from a silicon wafer and bonded to the underside structure foundation 342. The wall 1303 is defined with a through-silicon-via (TSV) etch process step following wafer bonding.

In another embodiment, the micro-platform 1301 of FIG. 13A is configured only with a field of nanotubes, typically vertical wall carbon nanotubes (VWCNT) thermally-connected with a support micro-platform and without MM structuring. The nanotube textured surface also provides an increased spectral range for broadband blackbody emission.

Blackbody electromagnetic radiation within the increased wavelength range 2 to 20 um provided by nanotube absorbers is in the range of 108 W/m$^2$/sr. In embodiments, the micro-platform infrared-absorbing area ranges from $10^{-10}$ to $10^{-4}$ m$^2$. In embodiments of the present invention, wherein the thermal conductivity of supporting nanowires and other thermal conductors is reduced into the nanoWatt/° C. range, self-cooling can occur.

Other salient features in FIG. 13 are the supporting nanowires 214, silicon oxide layer 344 of the starting SOI wafer, eutectic or conducting epoxy bond layer 354 between the silicon foundation 342 and header 352. Bonding pads 350 depict electrical connections through nanowires to passive and nanopower devices and circuits disposed on micro-platform 1301.

A very, very large-scale example of passive radiative surface cooling by blackbody-type radiative emission is provided by the ground surface in *Antarctica* where thermal ground radiation exits through the atmosphere due to extremely low humidity and limited solar heating. Ground surface temperatures in *Antarctica* are cooled below the temperature of surrounding atmosphere. This occurs because ground surface temperature is reduced to provide thermodynamic equilibrium with thermally radiated heat exiting through the atmosphere. This is in contrast with ground surfaces elsewhere in the world wherein thermal radiation from atmospheric water vapor and increased solar energy absorbed into the ground is greater than the surface radiative cooling.

Example 6—Passively Cooled Infrared Detector

Figure 14:
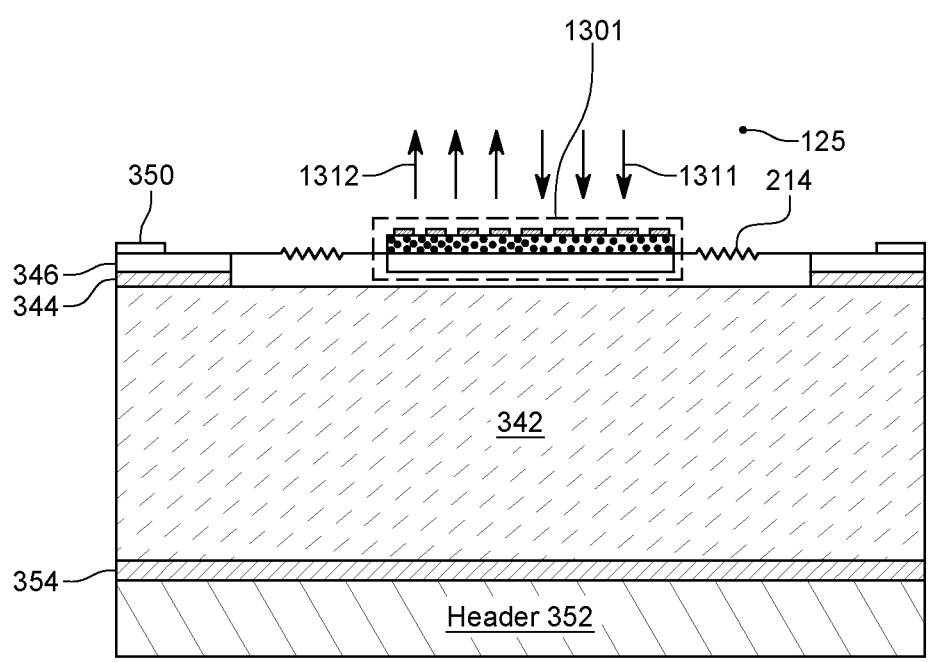
FIG. 14 depicts a cross-sectional view of the pixel configured for operation as a passive blackbody infrared emitter with a cooled micro-platform, partially exposed to incident LWIR radiation in accordance with embodiments of the invention.

FIG. 14 depicts the pixel comprising micro-platform 1301 in another embodiment wherein the micro-platform is cooled by radiative blackbody radiation 1311 into space 1. In this embodiment, radiation 1312 originating externally is limited and the net radiation 1312, 1311 cools the micro-platform 1301. This embodiment differs from that depicted in FIG. 13 wherein blackbody radiation from photonic structure passes through a pixel window that is transparent for LWIR radiation 1312, 1311 entering from both directions. In a typical embodiment, the enclosing header 352 is extended to comprise an infrared-transparent cover, and micro-platform 1311 is maintained under vacuum or a gas of lowest thermal conductivity.

In this embodiment, thermal radiation 1312 originating from a remote object or scene is focused onto the self-cooled micro-platform 1301 to provide an incremental heating, typically at the nanoWatt level. In this embodiment, an apparatus is physically configured with appropriate optics and an external IR source is focused onto the micro-platform 1301. This incident radiation 1312 heats micro-platform 1301 and is sensed by Seebeck sensing elements disposed on the micro-platform. In other embodiments, the micro-platform is configured with a field of nanotubes providing a broadband blackbody emissivity for cooling. We note that the intensity of external radiation 1312 is restricted by design and therefore the sensitivity of the detector to incident radiation is reduced.

Example 7—Pixel within a Focal Plane Array Imager

Figure 15:
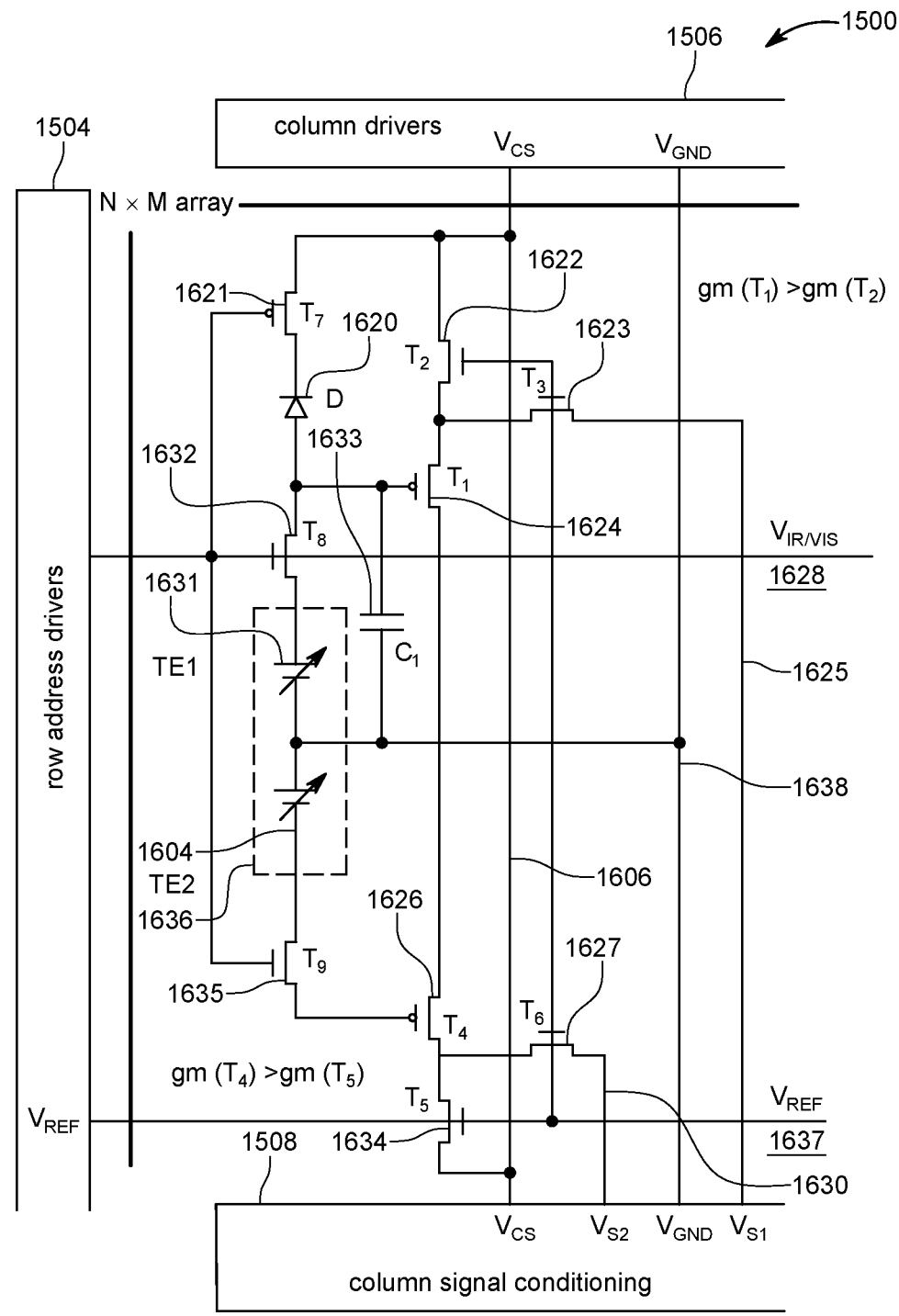
FIG. 15 depicts an imaging detector pixel comprising the thermal pixel disposed within an imaging system for visible and LWIR.

FIG. 15 depicts the thermal pixel disposed within the imaging detectorpixel of a focal plane array (FPA) imager 1500 comprised of both thermoelectric Seebeck elements 1631,1604 for sensing incident infrared radiation and a pn junction photodiode element 1620 for sensing visible and NIR radiation. FIG. 15 also depicts the peripheral CMOS circuitry within the pixel including row address drivers 1504, column drivers 1506 and column signal conditioning circuits 1508. The pixel signal output is provided as differential levels through column wires 1625 and 1630. The imaging pixel is replicated within the FPA in a two-dimensional matrix. Each pixel is powered through lines Vcs 1606 and VGNo 1638. Each pixel is addressed through lines Vcs, V1RN1*s* and VREF.

The thermoelectric sensor elements provide a passive signal source and are directly addressed through lines V1R1*v*1*s* and VREF. The imaging pixel is switched between infrared and visible wavelength bands through line V1R1*v*1*s*. The thermoelectric signal is amplified through separate inverters T1 1624, T2 1622 and $T_4$ 1626, T5 1634. The thermoelectric sensor elements provide a differential signal with respect to ground line VGND 1638.

Detection of visible light is obtained with pn junction sensor element D 1620, reverse biased by gate transistors T1 1621 and Ts 1632 to charge capacitor C1 1633 in response to incident visible radiation. Sensor element D is disposed outside the micro-platform 1636. The signal on capacitor C1 1633 is further amplified through the inverter comprising T1 1624, T2 1622 providing signal to lines S1 1625 and VGND 1638.

Signals received during successive time intervals from enabled imaging pixels are processed by the column signal conditioning circuit and formatted appropriately for image display or other purposes.

It is to be understood that although the disclosure teaches many examples of embodiments in accordance with the present teachings, many additional variations of the invention can easily be devised by those skilled in the art after reading this disclosure. As a consequence, the scope of the present invention is to be determined by the following claims.

What is claimed:

1. An electromagnetic thermal pixel (ETP) including photonic structure and phononic structure, the ETP comprising:
   a substrate having a substantially planar surface;
   a cavity formed from the substrate;
   a thermal micro-platform disposed within the cavity and suspended from the substrate by a plurality of nanowires; wherein,
   the phononic structure comprises:
   (i) a first layer of semiconductor disposed within at least one of the nanowires of the plurality, the first layer providing electrical conductivity;
   (ii) a phononic scattering structure and/or phononic resonant structure providing a reduction in thermal conductivity;
   the photonic structure comprises:
   (i) photonic nonresonant structure and/or photonic resonant structure providing emissivity and/or absorptivity of electromagnetic radiation within a range of one or more of visible, NIR, MWIR, LWIR, and millimeter wavelengths, and
   wherein the ETP further comprises at least one of a temperature sensor, a resistive heater, an infrared radiation source, a Peltier cooler, and a self-cooling micro-refrigerator.

2. The ETP of claim 1 wherein the ETP is disposed in an array of ETPs.

3. The ETP of claim 1 wherein the phononic scattering structure comprises scattering sites separated by distances less than a mean-free-path of heat-conducting phonons.

4. The ETP of claim 3 comprising porous silicon.

5. The ETP of claim 1 wherein the phononic resonant structure comprises a phononic crystal (PnC) having a phononic bandgap.

6. The ETP of claim 1 wherein the phononic structure comprises holes, vias, surface pillars, surface dots, plugs, cavities, implanted atomic species, local particulates, and molecular aggregates.

7. The ETP of claim 1 wherein the first layer of semiconductor is selected from the group consisting of Si, Ge, SiGe, GaAs, GaN, InP, SiC, TiN, $Bi_2Te_3$, $Bi_2Se_3$, $CoSb_3$, $Sb_2Te_3$, $La_3Te_4$, SnSe, ZnS, CdS, and semiconducting alloys/superlattice combinations thereof.

8. The ETP of claim 1 wherein the phononic structure further comprises an ALD metal layer or metallic interstitial layer selected from the group consisting of aluminum, tungsten, palladium, platinum, molybdenum.

9. The ETP of claim 1 wherein the phononic structure further comprises a dielectric layer comprising at least one material selected from the group consisting of silicon dioxide, silicon nitride, hafnium oxide, silicon oxynitride, and aluminum oxide, wherein the dielectric layer provides insulation between electrically conducting layers and/or a control of mechanical stress.

10. The ETP of claim 1 wherein the photonic resonant structure comprises at least one of a LC resonator, a split ring resonators (SRR), a photonic crystal (PhC) having deep-subwavelength dimensions providing an increase in emissivity and/or absorptivity within a limited wavelength range.

11. The ETP of claim 1 comprising at least one of a wavelength antenna and fractile antenna.

12. The ETP of claim 1 wherein the photonic nonresonant structure comprises at least one of carbon nanotubes, graphene mesh, gold black, carbon black and silicon grass, wherein the photonic nonresonant structure provides an increase in emissivity and/or absorptivity within a broadband wavelength range.

13. The ETP of claim 1 comprising the resistive heater, wherein the resistive heater comprises a gettering material, and when the resistive heater is enabled, the resistive heater increases a level of vacuum within the cavity.

14. The ETP claim 1 comprising the temperature sensor, wherein the temperature sensor comprises at least one of a Seebeck thermoelectric sensor, thermistor, subthreshold MOS, and bolometer.

15. The ETP of claim 1 wherein the photonic structure comprises a reverse-biased pn junction diode.

16. The ETP of claim 1 wherein the Peltier cooler cools the micro-platform.

17. The ETP of claim 1 comprising the self-cooling micro-refrigerator, wherein the self-cooling micro-refrigerator is disposed in the cavity and is hermetically sealed and maintained in a vacuum condition, and further wherein the one or more of the nanowires provide thermal isolation from the substrate sufficient for the micro-platform to cool spontaneously via emitted thermal radiation.

18. The ETP of claim 1 comprising the resistive heater, wherein the resistive heater is operated to provide a photonic source of electromagnetic radiation.

19. The ETP of claim 1 wherein the resistive heater or the temperature sensor provide a photonic source or photonic detector, respectively, within a photospectrometer or pyrometer.

20. The ETP of claim 1 comprising the resistive heater or temperature sensor providing a photonic source or photonic detector, respectively, within a photonic communication system.

* * * * *